United States Patent
Loghin et al.

(10) Patent No.: US 11,165,486 B2
(45) Date of Patent: Nov. 2, 2021

(54) BEAMFORMING DEVICE FOR ANTENNA ARRAYS

(71) Applicant: SONY CORPORATION, Tokyo (JP)

(72) Inventors: Nabil Sven Loghin, Stuttgart (DE); Dana Ciochina, Stuttgart (DE); Thomas Handte, Stuttgart (DE); Felix Fellhauer, Stuttgart (DE); Fares Zenaidi, Stuttgart (DE); Stefan Uhlich, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 403 days.

(21) Appl. No.: 16/083,998

(22) PCT Filed: Mar. 10, 2017

(86) PCT No.: PCT/EP2017/055723
§ 371 (c)(1),
(2) Date: Sep. 11, 2018

(87) PCT Pub. No.: WO2017/153588
PCT Pub. Date: Sep. 14, 2017

(65) Prior Publication Data
US 2020/0295817 A1    Sep. 17, 2020

(30) Foreign Application Priority Data

Mar. 11, 2016  (EP) .................................. 16159898
Sep. 9, 2016   (EP) .................................. 16188104
Nov. 4, 2016   (EP) .................................. 16197221

(51) Int. Cl.
*H04B 7/08*   (2006.01)
*H04B 7/06*   (2006.01)
*H04W 16/28*  (2009.01)

(52) U.S. Cl.
CPC ........... *H04B 7/088* (2013.01); *H04B 7/0617* (2013.01); *H04B 7/0691* (2013.01);
(Continued)

(58) Field of Classification Search
CPC .... H04B 7/088; H04B 7/0617; H04B 7/0691; H04B 7/0695; H04B 7/086; H04B 7/0874; H04W 16/28
See application file for complete search history.

(56) References Cited

U.S. PATENT DOCUMENTS

2004/0037263 A1* 2/2004 Zeira .................... H04B 7/0617
                                                    370/347
2006/0094373 A1* 5/2006 Hottinen .............. H04B 7/0639
                                                    455/73

(Continued)

FOREIGN PATENT DOCUMENTS

WO      2014074894 A1    5/2014

OTHER PUBLICATIONS

"Part 11: Wireless LAN Medium Access Control (MAC) and Physical Layer (PHY) Specifications Amendment 3: Enhancements for Very Hgh Throughput in the 60GHz Band," IEEE Computer Society, IEEE Std 802.11ad™ -2012, pp. 1-628 (Oct. 19, 2012).

(Continued)

*Primary Examiner* — Jael M Ulysse
(74) *Attorney, Agent, or Firm* — Xsensus, LLP

(57) ABSTRACT

The improved beamforming devices for communication systems operating in the mm-wave spectrum are particularly designed for antenna architectures consisting of antenna arrays, comprising multiple antenna array elements. The disclosed approaches comprise intelligent two stage searches, wherein information from the first stage is used in (Continued)

the second stage. This significantly reduces the computational complexity compared to the known approaches, with minimal loss in performance.

32 Claims, 12 Drawing Sheets

(52) U.S. Cl.
CPC ........... *H04B 7/0695* (2013.01); *H04B 7/086* (2013.01); *H04B 7/0874* (2013.01); *H04W 16/28* (2013.01)

(56) References Cited

U.S. PATENT DOCUMENTS

| | | | | |
|---|---|---|---|---|
| 2007/0046539 | A1* | 3/2007 | Mani | H04B 7/0691 342/383 |
| 2007/0054701 | A1* | 3/2007 | Hovers | H04B 7/088 455/562.1 |
| 2007/0165736 | A1* | 7/2007 | Wang | H04B 7/0695 375/267 |
| 2007/0285312 | A1* | 12/2007 | Gao | H01Q 3/24 342/367 |
| 2008/0009321 | A1* | 1/2008 | Sayeed | H01Q 3/2605 455/562.1 |
| 2008/0240031 | A1* | 10/2008 | Nassiri-Toussi | H04L 25/0204 370/329 |
| 2009/0005121 | A1* | 1/2009 | Wong | H01Q 3/26 455/562.1 |
| 2009/0189812 | A1* | 7/2009 | Xia | H04B 17/24 342/374 |
| 2009/0232240 | A1* | 9/2009 | Lakkis | H04B 7/0491 375/260 |
| 2010/0046665 | A1* | 2/2010 | Sadowsky | H04B 7/0634 375/296 |
| 2010/0159845 | A1* | 6/2010 | Kaaja | H04B 7/088 455/70 |
| 2010/0210219 | A1* | 8/2010 | Stirling-Gallacher | H04B 7/0695 455/67.11 |
| 2010/0214169 | A1* | 8/2010 | Kafle | H04B 7/0695 342/368 |
| 2011/0149842 | A1* | 6/2011 | Cordeiro | H04B 7/0491 370/328 |
| 2011/0211490 | A1* | 9/2011 | Nikula | H04B 7/086 370/252 |
| 2012/0052828 | A1* | 3/2012 | Kamel | H04B 17/104 455/226.2 |
| 2013/0059545 | A1* | 3/2013 | Kyosti | G01R 29/105 455/67.12 |
| 2013/0315325 | A1* | 11/2013 | Wang | H04B 7/0695 375/267 |
| 2014/0307654 | A1* | 10/2014 | Kim | H04B 7/0647 370/329 |
| 2015/0010099 | A1* | 1/2015 | Lin | H04B 7/0608 375/267 |
| 2015/0124738 | A1* | 5/2015 | Ramakrishna | H04L 5/0048 370/329 |
| 2015/0244432 | A1* | 8/2015 | Wang | H04B 7/0695 375/267 |
| 2015/0333811 | A1* | 11/2015 | Yu | H04B 7/0617 370/329 |
| 2015/0333894 | A1* | 11/2015 | Wang | H04W 72/046 370/329 |
| 2015/0341095 | A1* | 11/2015 | Yu | H04B 7/061 370/252 |
| 2016/0050008 | A1* | 2/2016 | Cordeiro | H04B 7/063 375/267 |
| 2016/0119910 | A1* | 4/2016 | Krzymien | H04L 5/0023 370/329 |
| 2016/0181703 | A1* | 6/2016 | Choudhury | H01Q 25/04 343/893 |
| 2017/0142605 | A1* | 5/2017 | Cheng | H04B 7/0617 |
| 2017/0195025 | A1* | 7/2017 | Kohli | H04B 7/088 |
| 2017/0207530 | A1* | 7/2017 | Anderson | H01Q 1/2291 |
| 2017/0222315 | A1* | 8/2017 | Hozouri | H04W 72/085 |

OTHER PUBLICATIONS

Capar, C., et al., "Beam Selection for Hybrid MIMO Precoding," IEEE 802.11-15/0627r0, pp. 1-15 (May 2015).
Capar, C., et al., "Efficient Beam Selection for Hybrid B42 Beamforming," IEEE 802.11-15/1131r0, pp. 1-6 (Sep. 14, 2015).
Cordeiro, C., et al., "Next Generation 802.11ad 30+ Gbps WLAN", IEEE 11-14/0606r0, pp. 1-29 (May 2014).
Heath Jr., R.W., et al., "An Overview of Signal Processing Techniques for Millimeter Wave MIMO Systems," in IEEE Journal of Selected Topics in Signal Processing, vol. 10, No. 3, pp. 436-453 (Apr. 2016).
International Search Report and Written Opinion for International Application No. PCT/EP2017/055723, dated Sep. 6, 2017.
Nitsche, T., et al., "IEEE 802.11ad: Directional 60 GHz Communication for Multi-Gigabit-per-Second Wi-Fi," IEEE Communications Magazine, IEEE Service Center, Radio Communications, vol. 52, Issue 12, pp. 132-141 (Dec. 1, 2014).
Partial Search Report for International Application No. PCT/EP2017/055723, dated May 24, 2017.
Vitale, M., "Genetic Algorithm Assisted Adaptive Beamforming," Proceedings IEEE 56th Vehicular Technology Conference, vol. 1, pp. 601-605 (2002).
Wang, J., et al., "Beam Codebook Based Beamforming Protocol for Multi-Gbps Millimeter-Wave WPAN Systems," IEEE Journal on Selected Areas in Communications, vol. 27, No. 8, pp. 1390-199 (Oct. 2009).
Korean Office Action dated Dec. 18, 2019 in Korean Patent Application No. 10-2018-7026201.

* cited by examiner

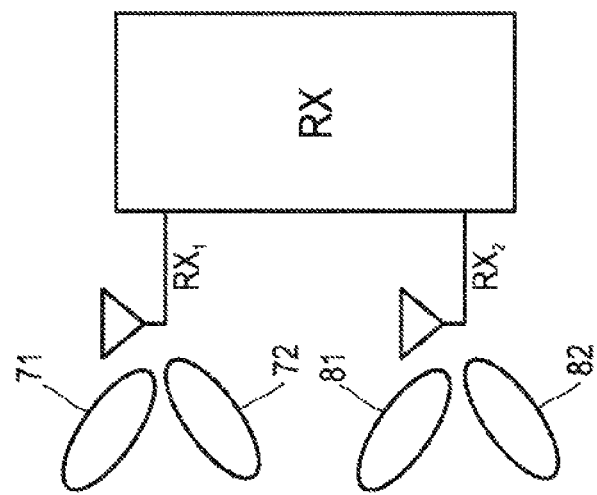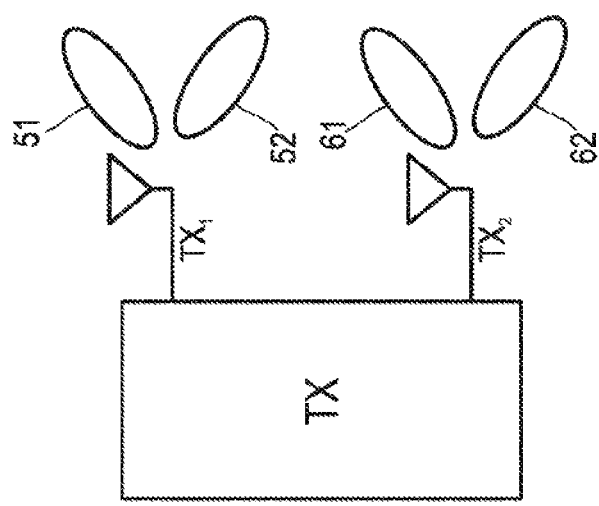
Fig. 7

| Description | Frame Control | Duration | RX MAC Address | TX MAC Address | SSW Feedback Field | BRP Request | BF Link Maintainance | FCS |
|---|---|---|---|---|---|---|---|---|
| Bits | 16 | 16 | 48 | 48 | 24 | 32 | 8 | 32 |

Fig. 10A

| Description | Selected Sector | DMG Antenna | SNR Report | Poll Request | Reserved |
|---|---|---|---|---|---|
| Length | 6 | 2 | 8 | 1 | 7 |

Fig. 10B

| Description | Frame Control | Duration | Addressing | SSW Feedback Field | BRP Request | BF Link Maintainance | FCS |
|---|---|---|---|---|---|---|---|
| Bits | 16 | 16 | 16 | 24+16x5 | 32 | 8 | 32 |

Fig. 11A

| Description | Selected Sectors | DMG Antenna | SNR Report | Poll Request | Reserved |
|---|---|---|---|---|---|
| Length | 6*n | 2*n | 8*n | 1 | 7 | n=6 sectors

Fig. 11B

| Description | Selected Sector | | | SNR Report | | |
|---|---|---|---|---|---|---|
| Bits | $i_1$ | ... | $i_n$ | $s_1$ | ... | $s_n$ |

Fig. 12A

| Description | Selected Sector | | | SNR Report | | |
|---|---|---|---|---|---|---|
| Length | $l_1$ | ... | $l_n$ | $s_1$ | ... | $s_{\Delta n}$ |

Fig. 12B

| Description | Packet Type | Addressing | Extended SSW Feedback | RX RF chain ID | Poll Request | Reserved | BRP Request | BF Link Maintainance | FCS |
|---|---|---|---|---|---|---|---|---|---|
| Bits | 2 | 16 | 21 x n | 2 | 1 | L(n) | 32 | 1 | 32 |

Fig. 13A

| CDOWN Index | SINR Report | RF Chain ID |
|---|---|---|
| 11 x n | 8 x n | 2 x n |

Fig. 13B

| Description | Packet Type | Addressing | Extended SSW Feedback | RX RF chain ID | Poll Request | Reserved | BRP Request | Direction | FCS |
|---|---|---|---|---|---|---|---|---|---|
| Bits | 2 | 16 | 21 x n | 2 | 1 | L(n) | 32 | 1 | 32 |

Fig. 13C

| Description | CDOWN | | | SNR Report | | |
|---|---|---|---|---|---|---|
| Length | $i_1$ | ... | $i_n$ | $s_1$ | ... | $s_n$ |

Fig. 14A

| Description | CDOWN | | | SNR Report | | |
|---|---|---|---|---|---|---|
| Length | $i_1$ | ... | $i_n$ | $s_1$ | ... | $s_{An}$ |

Fig. 14B

| Description | Frame Control | Duration | Addressing | Number of Sectors | SSW Feedback Field | BRP Request | BF Link Maintainance | FCS |
|---|---|---|---|---|---|---|---|---|
| Bits | 16 | 16 | 16 | n_1 | 24+16x5·n1 | 32 | 8 | 32 |

Fig. 15A

| Description | Packet Type | Addressing | No of Sectors | CDOWN Index | SINR Reports | BRP Request | BF Link Maintainance | FCS |
|---|---|---|---|---|---|---|---|---|
| Bits | 2 | 16 | n1 | 11*n | 8*n | 32 | 8 | 32 |

Fig. 15B

| Description | Packet Type | Addressing | No of Sectors | CDOWN Index | SINR Reports | BRP Request | Direction | Reserved | FCS |
|---|---|---|---|---|---|---|---|---|---|
| Bits | 2 | 16 | n1 | 11*n | 8*n | 32 | 1 | 1 | 4 |

Fig. 15C

| Description | Packet Type | Addressing | Fragmented bit | Extended SSW Feedback | RX RF chain ID | Poll Request | Reserved | BRP Request | BF Link Maintainance | FCS |
|---|---|---|---|---|---|---|---|---|---|---|
| Bits | 2 | 16 | 1 | 21*n | 2 | 1 | L(n) | 32 | 8 | 32 |

Fig. 16

| Description | Packet Type | Addressing | Fragmented bit | N_sectors | Extended SSW Feedback | RX RF chain ID | Poll Request | Reserved | BRP Request | BF Link Maintainance | FCS |
|---|---|---|---|---|---|---|---|---|---|---|---|
| Bits | 2 | 16 | 1 | N_s | 21*n | 2 | 1 | L(n)-N_s | 32 | 8 | 32 |

Fig. 17

BEAMFORMING DEVICE FOR ANTENNA ARRAYS

The present application claims priority to European Patent Application 16159898.2 filed by the European Patent Office on 11 Mar. 2016 and 16188104.0 on 9 Sep. 2016 and 16197221.1 on 4 Nov. 2016, the entire contents of which being incorporated herein by reference.

BACKGROUND

Field of the Disclosure

The present disclosure relates to a beamforming device and a beamforming method for use in a wireless communication system comprising an initiator and a responder or, more generally, two communication devices to enable communication with each other through the wireless communication system. Further, the present disclosure relates to a communication device and a communication system.

Description of Related Art

A significant challenge for the operation in mm-wave bands (i.e., operating around and/or above 30 GHz) is the strong pathloss, experienced at high frequencies. This can be compensated by the use of highly directive antennas composed of many antenna elements, which de-phase and thereby amplify the transmitted and received signals to obtain desired beamforming effects. Since individually shaping the signal on each individual antenna element implies the use of a dedicated RF chain, which is practically cost-ineffective, hybrid architectures consisting of multiple antenna arrays (i.e. antennas each having multiple antenna elements) have been proposed, e.g. in C. Cordeiro et al, "Next Generation 802.11ad 30+ Gbps WLAN", IEEE 802.11, May 2014. In these "hybrid MIMO settings", the antenna arrays comprise multiple phase shifters and are able to perform a coarse analog beamforming, by means of which the pathloss can be mitigated and thereby communication between devices can be enabled.

Analog beamforming corresponds to the act of physically steering one or more directional beams into a preferred direction, e.g. by means of analog phase shifters or by changing the phase characteristics of an antenna array. Further, the complete arrays, rather than each individual element thereof, are connected to RF chains. Finer digital beamformers can be created on top of the analog ones. In this manner a full MIMO capability can be obtained, in which multiple streams can be simultaneously transmitted and spatial multiplexing can be achieved. Digital beamforming corresponds to a more general concept, in which both amplitudes and phases can be controlled of each transmitted beam. After pre-coding at transmitter side, and decoding at receiver side, the beams can be separated again.

The beamforming design in the mm-wave domain is essentially different than the traditional beamforming problems. This is because in traditional beamforming problems, channel state information (CSI) is assumed to be available and beamformers are designed to optimize a given metric (e.g., throughput), given the CSI. In the mm-wave domain, obtaining the CSI before the analog beamforming procedure is impossible due to the weak channels. In the absence of CSI, the optimal analog beamforming solution can be obtained as the solution of an exhaustive search procedure which is computationally very expensive and thus impractical.

Hereinafter, a single user scenario is considered, in which two devices, further referred to as initiator (or first transceiver or first communication device, e.g., access point or station) and responder (or second transceiver or second communication device, e.g., station or access point), each equipped with one or more antenna arrays, including one or more antenna array elements), aim to find the optimal beamformers (i.e. the optimal antenna beam combination), in the sense that maximum throughput can be achieved between them.

For this problem, a solution has been proposed in the 802.11 ad standard (IEEE Working Group, "Wireless LAN Medium Access (MAC) and Physical Layer (PHY) Specification Amendment 3: Enhancements for Very High Throughput in the 60 GHz Band," 2012), under the simplifying assumption that only one antenna array is present or actively used at both initiator and responder thus supporting only single input single output (SISO) communication. The method consists of two steps. In the first step, referred to as sector level sweep (SLS), a sector is swept with a directional beam at the initiator and a quasi-omnidirectional beam at the responder ("listening in all directions"). The strongest sectors (allowing maximum throughput and/or received signal strength) are fed back from responder to initiator. The procedure is reversed and repeated for the responder. The beams obtained in this manner are further refined in a second stage, referred to as beam refinement phase (BRP), where combinations of beams are tested in order to obtain the strongest channel.

Further, in H. Persson, "Efficient Beam Selection for Hybrid Beamforming", IEEE 802.11, September 2015 a pairwise search algorithm is described for the general problem in which arbitrary numbers of antenna arrays are considered at both initiator and responder. In the first stage, each pair of antenna arrays at initiator and responder is considered separately. The beams that maximize the SISO capacity (or e.g. SNR) between each pair are found, using an exhaustive search for all beam directions on both sides. The beams that maximize the SISO capacity (i.e. SNR) between each pair are found, using an exhaustive search. The pair of antenna arrays at initiator and responder, which obtained the best SISO capacity and the corresponding beams are then fixed for the second stage. In this second stage the combinations of two further (at least partly not yet fixed) antenna arrays are considered and multiple input multiple output (MIMO) capacity between them is computed for all beam combinations, which are not yet fixed from the previous stage. This method is still computationally expensive as it consists of several stages of exhaustive search approaches.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a beamforming device and a beamforming method for use in a wireless communication system with reduced computational complexity, reduced time consumption and minimal loss of performance with respect to known solutions. It is a further object to provide a communication device, a communication system as well as a corresponding computer program for implementing the disclosed beamforming methods and a non-transitory computer-readable recording medium for implementing the disclosed beamforming methods.

According to an aspect there is provided a beamforming device for use in a wireless communication system, said beamforming device comprising a control unit for controlling the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays, a processing unit for selecting one or more initiator antenna beams per initiator antenna array and one or more responder antenna beams per responder antenna array for use by the initiator and the responder in communicating with each other, wherein said control unit and said processing unit are configured i) to control, by the control unit in a first training stage, the initiator antenna elements, per pair of initiator antenna array and responder antenna array, to transmit a first training signal by successively using different initiator antenna beams of different initiator antenna beam directions and to receive a first training signal transmitted by the responder antenna array by successively using different responder antenna beams of different responder antenna beam directions, ii) to select, by the processing unit, a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, iii) to control, by the control unit in the second training stage, the initiator antenna elements of the initiator antenna arrays to transmit a second training signal by successively using different initiator antenna beams of different initiator antenna beam directions according to one or more of the selected antenna beam combinations, and/or to receive a second training signal transmitted by the responder antenna elements of the one or more responder antenna arrays by successively using different responder antenna beams of different responder antenna beam directions according to one or more of the selected antenna beam combinations, and iv) to select, by the processing unit, a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

According to another aspect there is provided a beamforming device for use in a wireless communication system, said beamforming device comprising a control unit for controlling the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays, a processing unit for selecting one or more initiator antenna beams per initiator antenna array and one or more responder antenna beams per responder antenna array for use by the initiator and the responder in communicating with each other, wherein said control unit and said processing unit are configured i) to control, by the control unit in a first training stage, the responder antenna elements, per pair of initiator antenna array and responder antenna array to receive a first training signal transmitted by the initiator antenna array by successively using different initiator antenna beams of different initiator antenna beam directions and to transmit a first training signal by successively using different responder antenna beams of different responder antenna beam directions, ii) to select, by the processing unit, a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, iii) to control, by the control unit in the second training stage, the responder antenna elements of the responder antenna arrays to receive a second training signal transmitted by the initiator antenna elements of the one or more initiator antenna arrays by successively using different initiator antenna beams of different initiator antenna beam directions according to one or more of the selected antenna beam combinations and/or to transmit a second training signal by successively using different initiator antenna beams of different initiator antenna beam directions according to one or more of the selected antenna beam combinations, and iv) to select, by the processing unit, a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

According to a further aspect there is provided a communication device for communicating with another communication device in a wireless communication system, said communication device comprising one or more antenna arrays each comprising two or more antenna elements, and a beamforming device as disclosed herein.

According to a further aspect there is provided a communication system comprising a beamforming device as disclosed herein and two or more communication devices, each having at least one antenna array each comprising two or more antenna elements, wherein at least one communication device has at least two antenna arrays.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed methods, the disclosed communication device, the disclosed communication system, the disclosed computer program and the disclosed computer-readable recording medium have similar and/or identical further embodiments as the claimed transmitter and as defined in the dependent claims and disclosed herein.

One of the aspects of the disclosure is to provide improved beamforming training solutions for communication systems operating in the mm-wave spectrum. The disclosed approaches are particularly designed for antenna architectures consisting of multiple antenna arrays on the transmitter side (initiator side) and the receiver side (responder side), each antenna array comprising two or more antenna elements), which are seen as cost-effective enablers for communication in high frequency bands. Further, the disclosed approaches can generally also be used in SIMO or MISO configurations, in which the initiator or the responder comprises a single antenna array only. The disclosed solutions comprise intelligent two stage searches, wherein information from the first stage is used in the second stage. This significantly reduces the computational complexity compared to the known approaches, with minimal loss in performance or even better performance. Hence, with the disclosed solutions one or more initiator antenna beams per initiator antenna array and one or more responder antenna beams per responder antenna array are finally found for use by the initiator and the responder in communicating (uni-directionally or bi-directionally) with each other.

It should be noted that in the context of the present disclosure the term "successively" shall generally be understood as starting one after another or with minimal overlap, but does not necessarily imply an order of operation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 shows a diagram of an embodiment of a communication system for illustrating a genetic search algorithm, FIGS. 8A and B show diagrams illustrating the use of antenna scores and an overall score for selecting antenna beam combinations, FIG. 13B shows a diagram of a modified SSW Feedback Field, FIGS. 14A and B show diagrams illustrating other embodiments of a modified SSW feedback field, FIGS. 15A to C show diagrams illustrating modified SSW Feedback and ACK frames with variable numbers of sectors, FIG. 16 shows another embodiment of a short SSW frame including a fragmented bit field, and FIG. 17 shows another embodiment of a short SSW frame including a fragmented bit field and a field indicating the number of sectors present in an additional frame.

DETAILED DESCRIPTION OF THE EMBODIMENTS

Figure 1A:
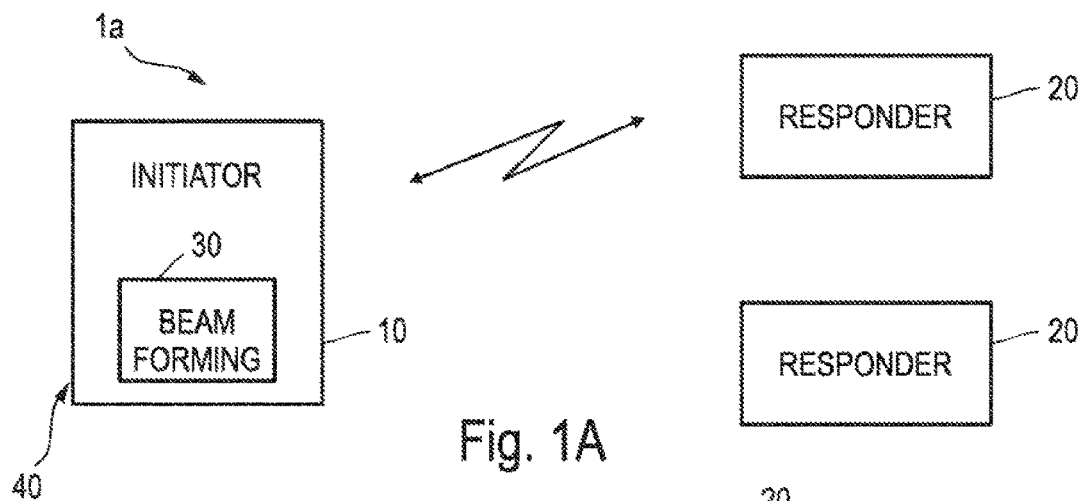
FIG. 1 shows a schematic diagram of different embodiments of the general layout of a communication system according to the present disclosure.

Referring now to the drawings, wherein like reference numerals designate identical or corresponding parts throughout the several views. FIG. 1 shows schematic diagrams of various general embodiments of a communication system according to the present disclosure. The communication system generally comprises an initiator 10 (e.g.

an access point), one or more responders 20 (e.g. stations, such as a smartphone, laptop, etc.) and one or more beamforming devices 30. When the initiator 10 and a responder 20 seek to communicate with each other (uni-directionally or bi-directionally) the optimal (in the sense of throughput and signal quality) beamforming, i.e. the optimal antenna beam combination of the antenna beam used by the initiator 10 and the responder 20, shall be found. This process of finding the optimal analog beamforming with low computational complexity and in a short time is addressed in this disclosure. In addition to analog beamforming digital beamforming can optionally be applied, which is not further addressed herein.

Figure 1B:
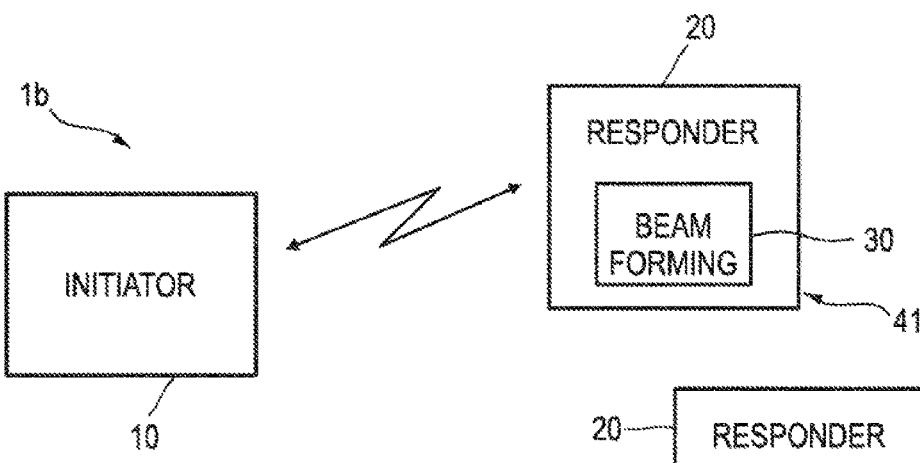
Figure 1C:
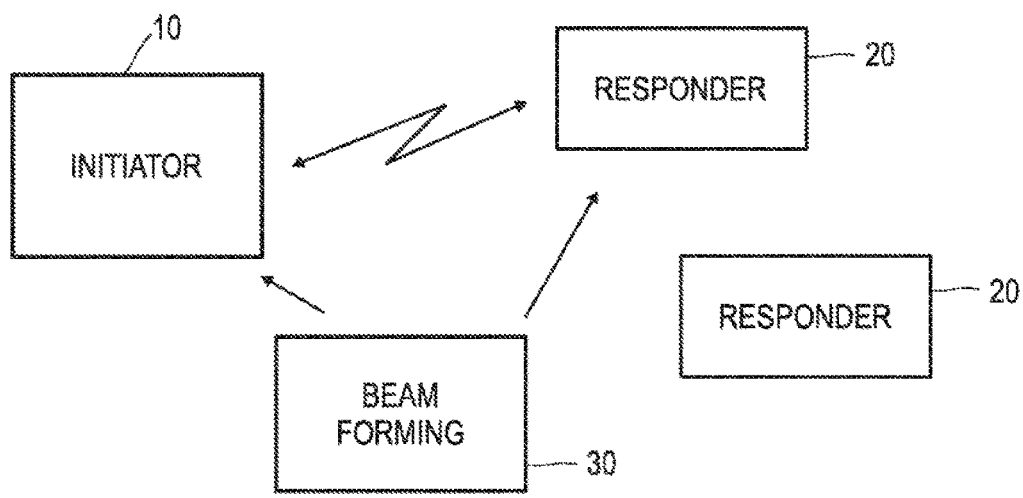

For this purpose the beamforming device 30 can be part of the initiator 10 (as in the communication system 1a shown in FIG. 1A) together forming a first communication device 40, can be part of the responder 20 (as in the communication system 1b shown in FIG. 1B) together forming a second communication device 41, or can be provided as separate entity (as in the communication system 1c shown in FIG. 1C). Even further, a beamforming device 30 can also be provided in the initiator 10 and each responder 20, or the tasks of the beamforming device 30 can be split between different beamforming devices provided in the initiator 10 and each responder 20.

Figure 2:
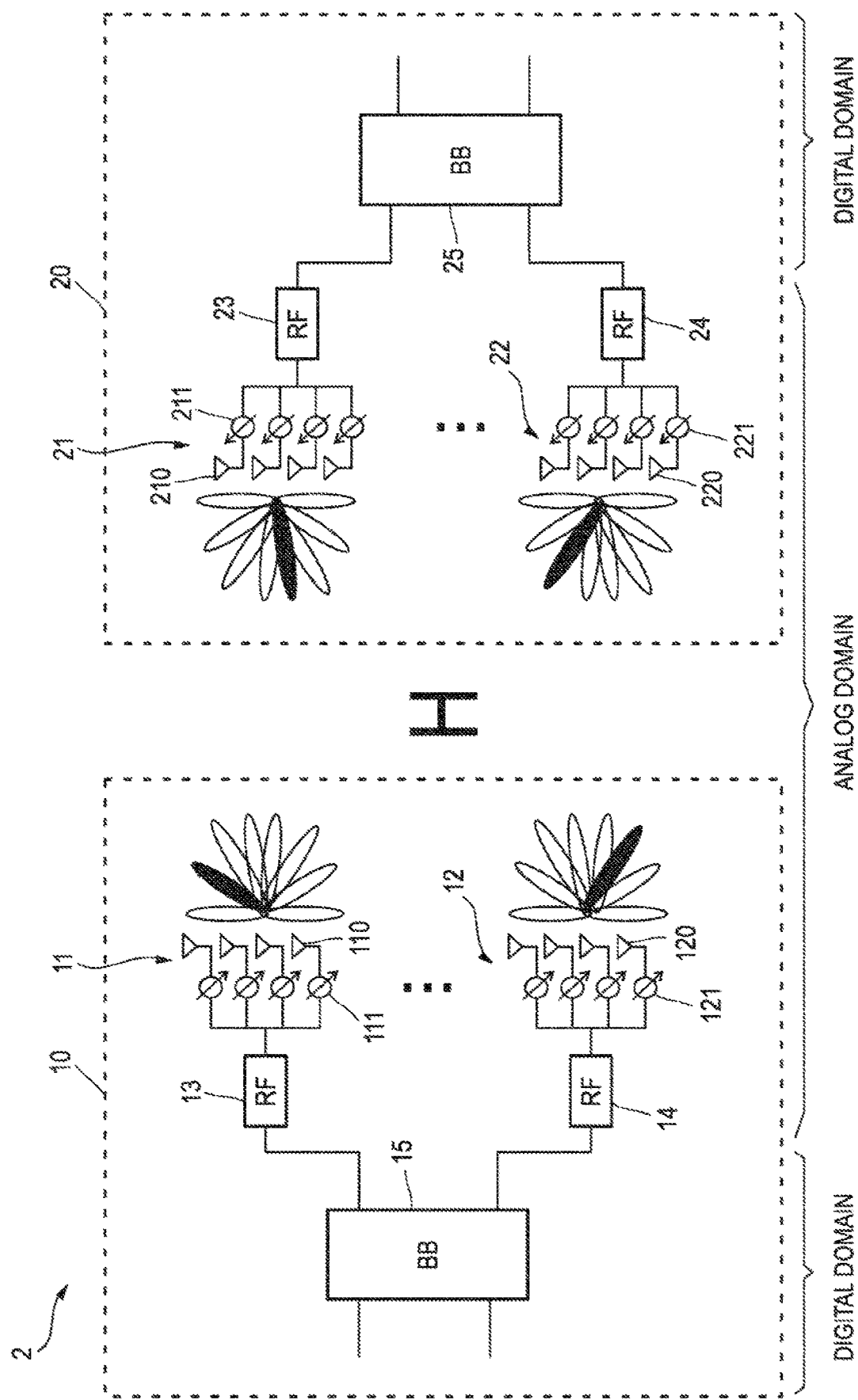
FIG. 2 shows a communication system illustrating a hybrid architecture of the initiator and the responder.

Before details of the disclosed approaches are explained, some explanations shall be provided about analog and hybrid beamforming in general. FIG. 2 shows a schematic diagram of a communication system 2 comprising an initiator 10 and a responder that wish to communicate over the channel (described by channel matrix H) to communicate with each other. The initiator 10 generally has one or more (two in this embodiment) initiator antenna arrays 11, 12, each comprising two or more (four in this embodiment) initiator antenna elements 110, 120. The responder 20 has one or more (two in this embodiment) responder antenna arrays 21, 22 each comprising two or more (four in this embodiment) responder antenna elements 210, 220. Generally, at least one of the initiator 10 and the responder 20 has at least two antenna arrays so that single input multiple output (SIMO), multiple input single output (MISO) or MIMO communication scheme can be used for the communication.

Analog beamforming is often implemented using a network of digitally controlled phase shifters. In this configuration, the antenna elements 110, 120, 210, 220 belonging to one antenna array 11, 12, 21, 22 are connected via phase shifters 111, 121, 211, 221 to a single RF chain 13, 14, 23, 24, as illustrated in FIG. 2 showing a communication system 2 using a hybrid architecture of the initiator 10 and the responder 20. Generally, the phase shifter weights are adaptively adjusted using digital signal processing using a specific strategy to steer one or more beams and meet a given objective, for example to maximize received signal power. The hybrid architecture shown in FIG. 2 uses MIMO communication at mm-wave frequencies and comprises, in addition to the analog domain, a digital domain. In the digital domain baseband precoding and combining is performed using a baseband (BB) processing circuit 15, 25 coupled to the respective RF chains 13, 14, 23, 24. More details of such a hybrid architecture as well as the function and the processing can be found in the documents cited in the background section.

Figure 3:
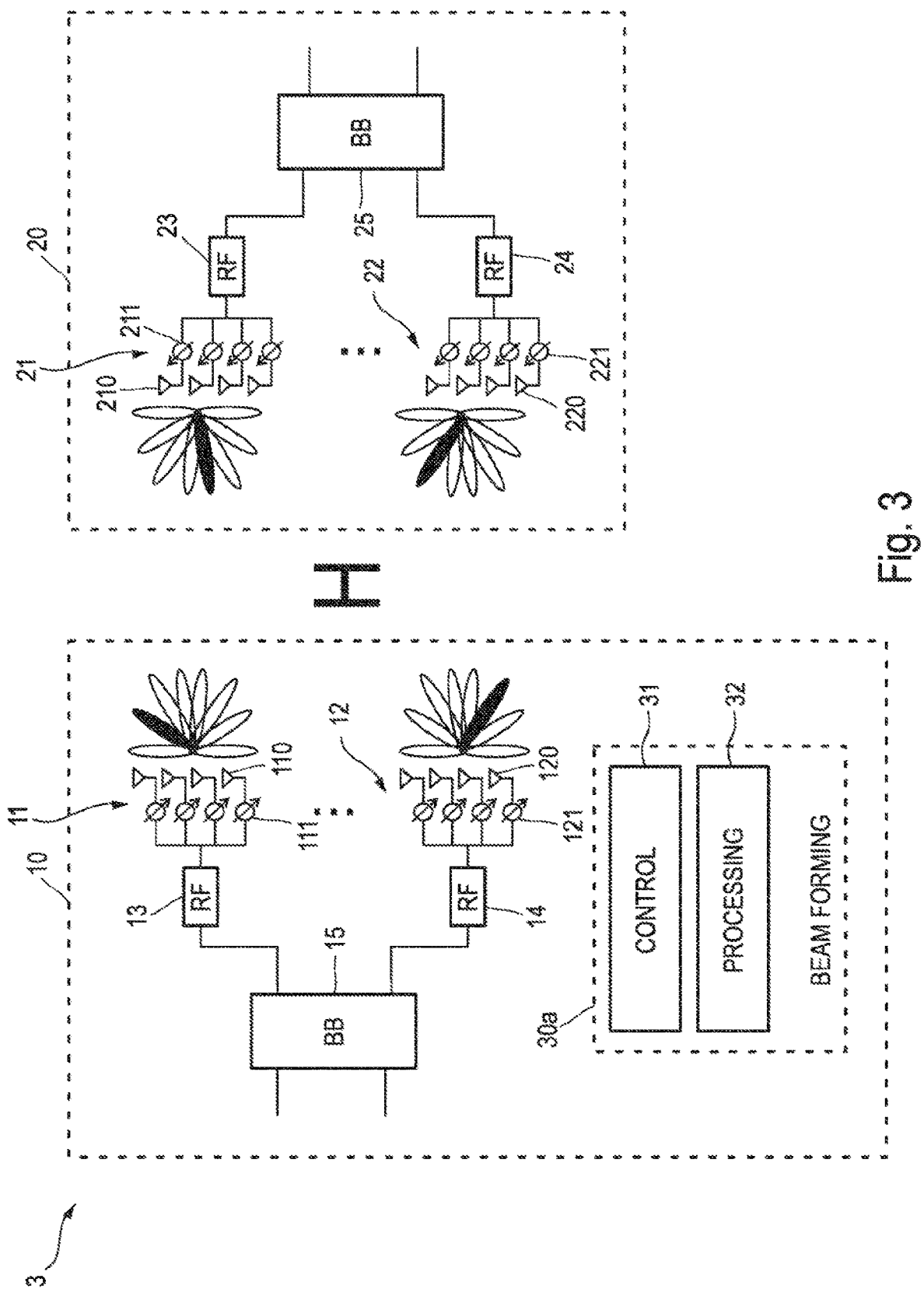
FIG. 3 shows a schematic diagram of a first detailed embodiment of a communication system according to the present disclosure.

FIG. 3 shows a schematic diagram of an embodiment of a communication system 3 according to the present disclosure. In this embodiment the initiator 10 comprises the beamforming device 30a, as shown in FIG. 1A. The beamforming device 30a generally comprises a control unit 31 for controlling the initiator 10 and a processing unit 32 for selecting one or more initiator antenna beams per initiator antenna array 11, 12 and one or more responder antenna beams per responder antenna array 21, 22 for use by the initiator 10 and the responder 20 in communicating with each other.

The method performed by the beamforming device generally comprises two stages, a first training stage and a second training stage. In the first training stage a SISO-like training is performed between different pairs of antenna arrays (i.e. between an initiator antenna array 11, 12 of the initiator 10 and a responder antenna array 21, 22 of the responder 20) to pre-select antenna combinations. The pre-selected antenna combinations are then further tested and/or used as starting points for further testing in the second training stage, in which a MIMO-, SIMO- and/MISO-like training is performed between one or more initiator antenna arrays 11, 12 and one or more responder antenna arrays 21, 22 of the responder 20 to find the best antenna beam combination for use in the subsequent combination of antenna beams, i.e. which antenna beam shall be used by each of the antenna arrays 11, 12, 21, 22. On top of this two-stage analog beamforming procedure, additional digital beamforming may be performed.

Figure 4:
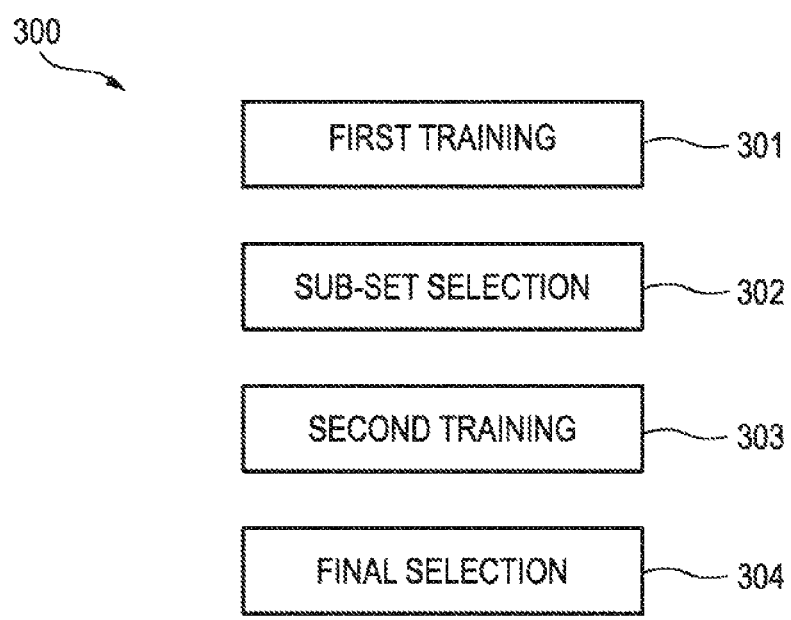
FIG. 4 shows a flow chart of a first embodiment of a beamforming method according to the present disclosure for use in the communication system shown in FIG. 3.

FIG. 4 shows a flow chart of an embodiment of a beamforming method 300 according to the present disclosure that may be carried out by the beamforming device 30a in the scenario illustrated in FIG. 3.

In a first step 301, referred to as first training stage, the control unit 31 controls the initiator antenna elements 110, 120, per pair of initiator antenna array 11, 12 and responder antenna array 21, 22, to transmit (in a first phase per pair) a first training signal by successively using different initiator antenna beams of different initiator antenna beam directions and to receive (in a second phase per pair) a first training signal transmitted by the responder antenna array 21, 22 by successively using different responder antenna beams of different responder antenna beam directions. The different responder antenna beams successively used by the responder antenna arrays 21, 22 may also be controlled by the control unit 31 of the beamforming device 30a (e.g. through control information transmitted to the responder 20), or may be controlled by a control unit of a separate beamforming device provided in the responder 20, or may be prescribed in advance (i.e. if the first training stage is started, a certain prescribed procedure is carried out).

In a second step 302 the processing unit 32 selects a sub-set of the antenna beam combinations that have been used in the first training stage for use in a second training stage. Hereby, at least some of the antenna beam combinations of said sub-set are selected by use of first responder quality information (e.g. a responder antenna score) indicating the quality of reception of the first training signals by the respective responder antenna array for the different initiator antenna beams used by the respective initiator antenna array for transmitting the first training signal and first initiator quality information (e.g. an initiator antenna score) indicating the quality of reception of the first training signals by the respective initiator antenna array for the different responder antenna beams used by the respective responder antenna array for transmitting the first training signal in the first training stage. Hereby, the first responder quality information and the first initiator quality information obtained for the different pairs of initiator antenna arrays and responder antenna arrays of the first training stage is used.

In an implementation, the first responder quality information may be provided by the responder 20 to the initiator 10, e.g. by transmission as separate data or by transmission along with or included in the first training signals transmitted by the responder antenna arrays in the second phase of the first training stage, and the first initiator quality information may be determined or calculated by the initiator 10 itself, e.g. by the processing unit 32.

The first initiator quality information and the first responder quality information is generally information indicating signal to noise ratio, signal to noise-and-interference ratio, received signal strength indication, the estimated capacity, received electric or magnetic field strength or delay spread per pair of initiator antenna array 11, 12 and responder antenna array 21, 22 and per antenna beam (i.e. per initiator antenna beam and per responder antenna beam).

In a third step 303, referred to as second training stage, the control unit 31 controls the initiator antenna elements 110, 120 of the initiator antenna arrays 11, 12 to commonly (i.e. simultaneously or successively), transmit a second training signal by successively using different initiator antenna beams of different initiator antenna beam directions according to the selected antenna beam combinations and/or to commonly receive with initiator antenna beams set according to the antenna beam combinations, selected in the first stage, a second training signal commonly transmitted by the responder antenna elements 210, 220 of the one or more responder antenna arrays 21, 22 by successively using different responder antenna beams of different responder antenna beam directions according to the selected antenna beam combinations.

In a fourth step 304 the processing unit selects a final antenna beam combination for use by the initiator 10 and the responder 20 in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

In an implementation, the second responder quality information may be provided by the responder 20 to the initiator 10, e.g. by transmission as separate data or by transmission along with or included in the second training signals transmitted by the responder antenna arrays, and the second initiator quality information may be determined by the initiator 10 itself, e.g. by the processing unit 32.

In an implementation, step 303 may comprise several sub-phases, wherein, in a first sub-phase a sub-set of the beam combinations, selected in the first training stage, are tested as described in step 303, and second responder quality information is computed. Depending on the second responder quality information, a second sub-phase can be performed as in step 303, wherein a different sub-set of the beam combinations, computed in the first training stage is used and second responder quality information is computed. This can be repeated until a termination criterion is met.

The second initiator quality information and/or the second responder quality information is information indicating the quality of the resulting communication link, such as the estimated capacity, sum of singular values, condition number, signal to interference plus noise ratio, or signal power of a channel matrix per complete antenna beam combination.

Hence, in the first training stage a coarse beamforming solution is found. In a particular implementation the procedure may (but needs not necessarily) be similar to the sector level sweep (SLS), currently included in the 802.11 lad standard: In a first phase of the first training stage the initiator 10 forms a directional beam with the first antenna array 11 and sweeps a sector, while the responder 20 listens with the first antenna array 21 set to a quasi-omnidirectional pattern. The same is performed with the directional beam formed by the second antenna array 12 at the initiator 10, while the responder 20 listens with second antenna array 22 set to quasi-omnidirectional pattern, then with the third antenna array and so on (most use-cases consider only two antenna arrays on each side, i.e., 2×2 case). The procedure is then repeated in a reversed fashion in a second phase of the first training stage, with the responder 20 creating the directional beams and the initiator 10 listening with quasi-omnidirectional patterns.

Hence, in this implementation the control unit 31 controls, in step 301, the initiator antenna elements 110, 120, per pair of initiator antenna array 11, 12 and responder antenna array 21, 22, to transmit (in a first phase) the first training signal by successively using different initiator antenna beams of different beam directions to a responder antenna array configured to receive the first training signal with an omnidirectional or wide-angle responder antenna beam and to receive (in a second phase) a first training signal transmitted by a responder antenna array 21, 22 by successively using different responder antenna beams of different beam directions, wherein the initiator antenna array 11, 12 is configured to receive the first training signal with an omnidirectional or wide-angle initiator antenna beam. In an alternative implementation, in the second phase, the initiator antenna elements 110, 120 may be controlled to transmit a first training signal with an (e.g. omnidirectional or wide-angle initiator antenna beam, wherein the responder antenna elements 210, 220 are controlled to receive the transmitted first training signal by successively using different responder antenna beams of different beam directions.

In another scenario the control unit 31 may control the initiator antenna arrays to commonly receive a first training signal transmitted by a responder antenna array 21, 22 by successively using different responder antenna beams of different beam directions, wherein the initiator antenna arrays 11, 12 are configured to receive the first training signal with an omnidirectional or wide-angle initiator antenna beam. The initiator antenna array, which attains the best reception quality for the antenna beams, transmitted by a responder antenna array 21, 22, will be considered paired to this responder antenna array and the scores for the second training stage will be defined per this pair.

In another implementation the control unit 31 controls, in step 301, the initiator antenna elements 110, 120, per pair of initiator antenna array 11, 12 and responder antenna array 21, 22, to transmit (in a first phase) the first training signal by successively using different initiator antenna beams of different initiator antenna beam directions to a responder antenna configured to receive the first training signal with a directed responder antenna beam, wherein the successive transmission of the first training signal with different initiator antenna beams of different initiator antenna beam directions is repeated multiple times, wherein in each iteration one or more different directed responder antenna beams are used for reception, and to receive (in a second phase) the first training signal transmitted from a responder antenna array 21, 22 by successively using different responder antenna beams of different responder antenna beam directions, wherein the initiator antenna array 11, 12 is configured to receive the first training signal with a directed initiator antenna beam, wherein the successive transmission of the first training signal with different responder antenna beams of different responder antenna beam directions is repeated multiple times, wherein in each iteration one or more different directed initiator antenna beams are used for reception. Thus, in this implementation a full or partial exhaustive or a pairwise search may be performed.

The training in the first training stage for all pairs of antenna arrays 11+21, 12+22, etc. between initiator 10 and responder 20 can be performed sequentially (more time consuming) or in parallel. Parallel training requires suppression of cross-talk. In a 2×2 case, where the two antenna arrays on each side apply different polarization (e.g., horizontal and vertical, left-hand circular and right-hand circular (i.e. both polarizations are used, but rotating in different directions)), the channel itself may provide sufficient suppression. In other cases, or in addition to channel-induced cross-talk attenuation, different (quasi-)orthogonal training sequences (waveforms) may be used on each antenna array. Correlating with the corresponding sequences at receiver side may suppress the influence from undesired training sequences. During this first stage information on quality (e.g. SNR) of different beams is stored for use within the second training stage.

In still another implementation the control unit 31 controls, in a first phase of the first training stage (i.e. step 301) and/or a second training stage (i.e. step 303), the initiator antenna elements 110, 120 to transmit the respective (first or second) training signal by successively using different initiator antenna beams having a first beam width and/or the responder antenna elements 210, 220 to receive the respective (first or second) training signal by successively using different responder antenna beams having a first beam width. The processing unit 32 then selects at least part of the antenna beam combinations of the sub-set of antenna beam combinations for use in a second phase of the same training stage based on the initiator antenna beam direction of the initiator antenna beam selected based on the responder quality information, e.g. providing the best responder quality information.

Further, the control unit 31 controls, in the second phase of the same training stage, the initiator antenna elements 110, 120 to transmit the training signal by successively using different initiator antenna beams having a second beam width different from the first beam width used in the first phase and having an initiator antenna beam direction identical or similar as the initiator antenna beam direction (in particular close to or within the initiator antenna beam sector) of the initiator antenna beam providing the best first initiator quality information in the first phase and/or the responder antenna elements 210, 220 to receive the training signal by successively using different responder antenna beams having a second beam width different from the first beam width used in the first phase and having a responder antenna beam direction identical or similar as the responder antenna beam direction of the responder antenna beam providing the best first responder quality information in the first phase.

Thus, according to this implementation variable beam (sector) widths may be used in the different phases. For instance, it is started with larger beam widths to find the best sectors, and then these best sectors are further investigated using smaller beam widths.

Figure 5:
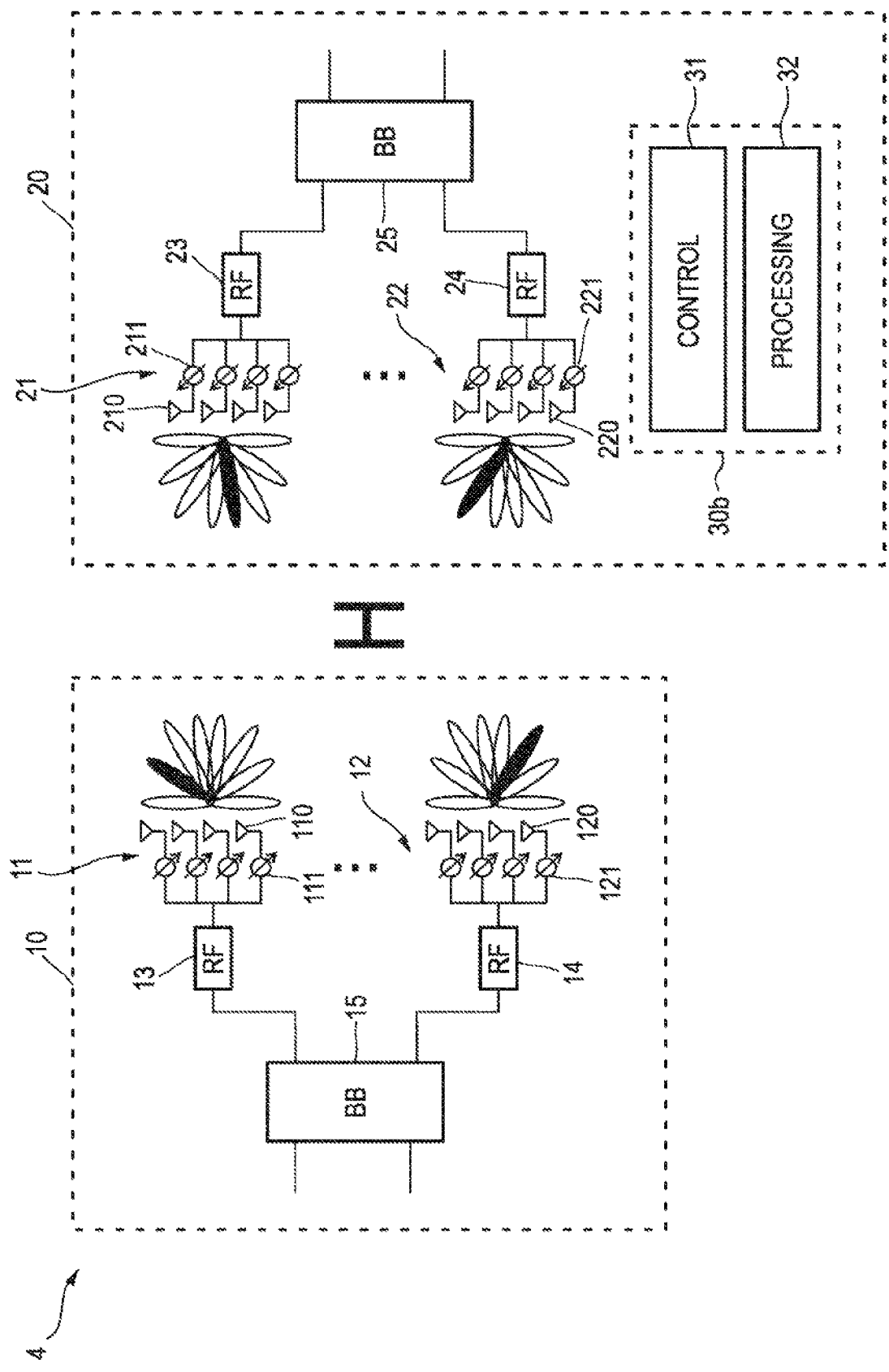
FIG. 5 shows a schematic diagram of a second detailed embodiment of a communication system according to the present disclosure.

FIG. 5 shows a schematic diagram of another embodiment of a communication system 4 according to the present disclosure. In this embodiment the responder 20 comprises the beamforming device 30b, as shown in FIG. 1B. Also in this embodiment the beamforming device 30b generally comprises a control unit 31 for controlling the responder 20 and a processing unit 32 for selecting one or more responder antenna beams per responder antenna array 21, 22 and one or more transmitter antenna beams per transmitter antenna array 11, 12 for use by the initiator 10 and the responder 20 in communicating with each other.

Figure 6:
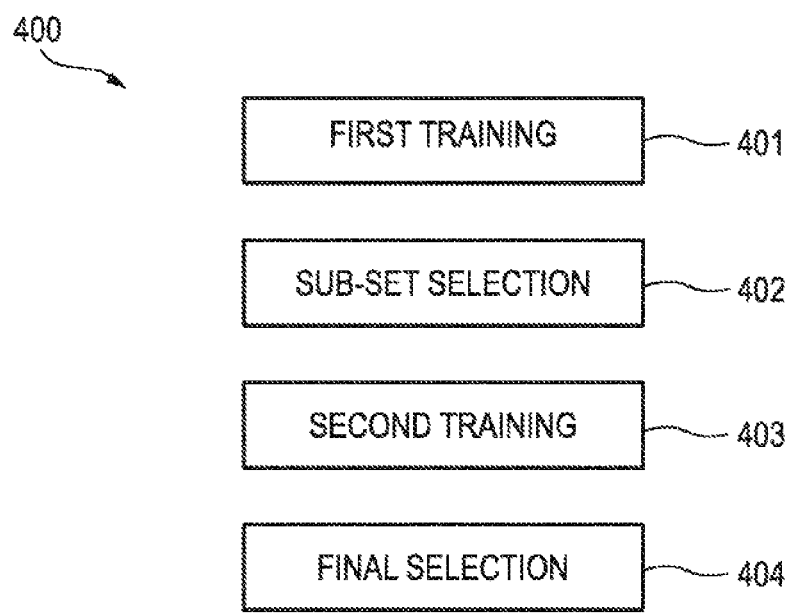
FIG. 6 shows a flow chart of a second embodiment of a beamforming method according to the present disclosure for use in the communication system shown in FIG. 5.

FIG. 6 shows a flow chart of an embodiment of a beamforming method 400 according to the present disclosure that may be carried out by the beamforming device 30b in the scenario illustrated in FIG. 5.

In step 401 the control unit 31 controls, in a first training stage, the responder antenna elements 210, 220, per pair of initiator antenna array 11, 12 and responder antenna array 21, 22 to receive a first training signal transmitted by the initiator antenna array 11, 12 by successively using different initiator antenna beams of different initiator antenna beam directions and to transmit a first training signal by successively using different responder antenna beams of different responder antenna beam directions.

In second step 402 the processing unit 32 selects a sub-set of the antenna beam combinations that have been used in the first training stage for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage.

In a third step 403 the control unit 31 controls, in the second training stage, the responder antenna elements 210, 220 of the responder antenna arrays 21, 22 to receive a second training signal commonly transmitted by the initiator antenna elements 110, 120 of the one or more initiator antenna arrays 11, 12 by successively using different initiator antenna beams of different initiator antenna beam directions according to one or more of the selected antenna beam combinations and/or to commonly transmit a second training signal by successively using different initiator antenna beams of different initiator antenna beam directions according to one or more of the selected antenna beam combinations.

In another scenario the responder may commonly receive with multiple antenna arrays, set according to the beam combinations selected in the first training stage, the second training signal transmitted by an initiator antenna by commonly transmitting using different initiator antenna beams of different initiator antenna beam directions according to one or more of the selected antenna beam combinations.

In a fourth step 404 the processing unit 32 selects a final antenna beam combination for use by the initiator 10 and the responder 20 in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

In an implementation, the second initiator quality information may be provided by the initiator 10 to the responder 20, e.g. by transmission as separate data or by transmission along with second training signals transmitted by the initiator antenna arrays, and the second responder quality information may be determined by the responder 20 itself, e.g. by the processing unit 32.

Also the beamforming device 30b can be configured further in a similar or equivalent manner as explained above for the various implementations of the beamforming device 30a.

In another embodiment the processing unit 32 is configured to select, per pair of initiator antenna array 11, 12 and responder antenna array 21, 22, combinations of initiator antenna beams and responder antenna beams to be used in the first training stage by use of a genetic or evolutionary search algorithm. Further, the processing unit 32 may be configured to select the sub-set of antenna beam combinations for use in the second training stage by use of a genetic or evolutionary search algorithm. Hereby, part of the antenna beam combinations of the sub-set for use in the second training stage may be selected randomly, in particular by use of a uniform or non-uniform probability distribution. Further, in each iteration of step iv) in the second training stage, the second responder quality information and/or the second initiator quality information may be used to determine an overall score for the overall antenna beam combination used in said iteration and to compare the determined overall score with the overall score of the previous iterations. Hence, in each iteration the overall antenna beam combination having the best overall score up to said iteration, may be set as preliminary best antenna beam combination and the overall antenna beam combination to be used in the next iteration may be selected based on the preliminary best antenna beam combination.

Thus, the coarse beams obtained in the first stage may both be utilized as initial beams for a genetic search algorithm, in which combinations of beams are tested. The genetic search comprises testing the best obtained beam with crossover variants i.e., combinations of the best obtained beams at the initiator and random beams at the responder and vice versa. More precisely, during each iteration of the genetic search algorithm, the following combinations may be tested: 1) random beams for the initiator antenna arrays and the best beams at the responder, 2) random beams for the responder antenna arrays and the best beams at the initiator, 3) random beams for both initiator and responder, and 4) best obtained beams. The random beams are generated such that the beams which have obtained a high score in the first training phase are more likely to be chosen. In general, all possible permutations or a subset of a random guess and the best obtained beams may be possible as well.

An exemplary embodiment of the genetic search algorithm that may be used according to the present disclosure will be illustrated with reference to FIG. 7 showing a 2×2 configuration of a transmitter Tx (e.g. representing the initiator) having two antenna arrays Tx1, Tx2 each including two transmit antenna elements (not shown) each providing a separate transmit antenna beam 51, 52, 61, 62 and a receiver Rx (e.g. representing the responder) having two receive antenna arrays Rx1, Rx2 each including two antenna elements (not shown) each providing a separate receive antenna beam 71, 72, 81, 82.

In more detail, $i=(i_1,i_2)$ defines a beam for each transmit antenna such that $i_1 \in \{51, 52\}$ and $i_2 \in \{61, 62\}$ and $j=(j_1,j_2)$ defines a beam for each receive antenna such that $j_1 \in \{71, 72\}$ and $j_2 \in \{81, 82\}$. At each iteration x, the input is the best combination of beams seen until iteration x−1, e.g. $(i^{(*)}, j^{(*)})=(51\ 61, 71, 81)$, with its associated best metric e.g. capacity value $C(51\ 61, 71, 81)=8.5$.

The execution may be as follows: In a first step beam combination guess $(i\ j)=(52\ 62, 72\ 82)$ is generated according to a certain probability distribution. In a second step crossovering is performed between $(i^{(*)}, j^{(*)})$ and $(i, j)$ to form two new combinations $(i^{(*)}, j)=(51\ 61, 72\ 82)$ and $(i, j^{(*)})=(52\ 62, 71\ 81)$. In a third step calculation of the metric (capacity) associated to the new three combinations is performed: $C(i, j)=C(52\ 62, 72\ 82)=8$, $C(i^{(*)},j)=C(51\ 61, 72\ 82)=8.3$, $C(i,j^{(*)})=C(52\ 62, 71\ 81)=8.7$. In a fourth step the combination achieving the highest capacity among $(i^{(*)}, j^{(*)})$ $(i, j)$ $(i^{(*)},j)$ $(i,j^{(*)})$ is set as new best combination for iteration x+1: $(i,j^{(*)})=(52\ 62, 71\ 81)$. The output is the best combination of beams $(i,j^{(*)})=(52\ 62, 71\ 81)$ seen until iteration x with its associated best capacity value $C(52\ 62, 71\ 81)=8.7$.

The beam combination guess may be made randomly, e.g. generated according to a uniform probability distribution with all combinations of beams having the same probability to be selected as guess. The beam combination guess may also be made with a priori knowledge, e.g. generated according to a non-uniform probability distribution or with each combination of beams having a certain probability to be selected as guess which is dependent on the score attached to it (i.e., higher score→higher probability). The crossover operation shown is just one possibility to generate the crossed combinations to investigate.

Various other metrics than MIMO capacity are possible, including signal to interference noise ratio, condition number, strongest tap, delay spread, rank of channel matrix, signal to noise ratio, etc.

The genetic search algorithm may be applied in the first training stage on top of the SISO training and/or during the second training stage for which guesses are either random or exploit SISO scores of the first training stage. In may further be applied in a pairwise search algorithm. e.g. in the first training stage of SISO training to replace a brute-force exhaustive search where beam combination guesses are random since there is no a priori information or in the second training stage of MIMO training to replace brute-force exhaustive search where beam combination guesses are random or exploit SISO information score of the first training stage.

In another embodiment the processing unit 32 uses the beam direction of the initiator antenna beam and/or the responder antenna beam providing the best initiator quality information and the best responder quality information for selecting antenna beam combinations used subsequently in the first training stage and/or the second training stage. Hence, in an implementation based on a desired metric, e.g. the signal to noise ratio (SNR) obtained in the first training stage, a score is computed for each combination of beams at the initiator 10 and responder 20. This score may be defined as the product (or sum) of the individual scores of the components of this combination. The beam combinations which obtained the best scores in the first training stage are now further tested in the second stage (also called beam refinement phase; BRP). The goal of this second training stage is to evaluate the MIMO capacity, which can be obtained when each device uses all antenna arrays with directional beams simultaneously. The reduction in complexity with respect to the exhaustive search is of more than one order of magnitude whereas the achieved MIMO capacity is only approx. 1% from the optimum after ten iterations of the second training stage. The scheme can be implemented with minimal changes to the frame structures, currently considered in the 802.11 lad BRP stage, allowing significant complexity reduction compared with known approaches such as pairwise search or a straightforward extension of 802.11ad procedure using exhaustive search in BRP. Further, there exists an algorithm which can find the K best combinations (e.g. products) from a large set of all possible combinations. More details of the best K search algorithm shall be provided in the following.

Let $T_1, \ldots, T_N$ denote N vectors with measured SNR values (or any other score, which relates directly or indirectly to the signal quality). Each vector $T_n$ consists of L SNR values denoted by $t_n^{(i)} \in T_n$, wherein i denotes the index inside this vector, i.e., $$T_n = [t_n^{(1)}, t_n^{(2)}, \ldots, t_n^{(L)}].$$

It is assumed that the values are already ordered, i.e., $t_n^{(i)} \geq t_n^{(i+1)} \geq t_n^{(i+2)} \ldots$. Given these tables, it is looked for the K best combinations such that the sums $$S^{(k)} = \sum_{\substack{n=1 \\ t_n^{(i)} \in T_n, \\ \text{such that index set } I^{(k)}}}^{N} t_n^{(i)}, S^{(1)} \geq S^{(2)} \geq \cdots \geq S^{(K)}$$

are as large as possible. Alternatively, the product of the individual values can also be considered. Applying the monotonically logarithm function on a product transfers this combination to above sum.

The corresponding combination of vectors indices can be denoted as $$I^{(k)} = [i_1^{(k)}, \ldots, i_N^{(k)}]$$

where $i_n^{(k)}$ gives the index of the element that is chosen from the nth vector $T_n$ for the kth best combination. It can immediately be seen that the best solution $S^{(1)}$ is given by picking the elements with the maximum value for each vector $T_n$. Instead of using a brute force approach and looking at all possible combinations (consisting of $L^N$ combinations), an iterative approach to find the K best combinations will now be described:

1. Sort elements in the N vectors $T_1, \ldots, T_N$ in descending order. Hence, after sorting, we know that the first index vector $I^{(1)}$ of the best combination is given by $I^{(1)} = [1, \ldots, 1]$. The corresponding maximum sum is $S^{(1)} = \sum_{n=1}^{N} t_n^{(1)}$.

2. Compute difference vectors $D_n$ for each vector $T_n$, where the elements in $D_n$ give the difference between two neighboring elements $T_n$, i.e., $D_n = [t_n^{(2)} - t_n^{(1)}, t_n^{(3)} - t_n^{(2)}, \ldots, t_n^{(i+1)} - t_n^{(i)}, \ldots, t_n^{(L)} - t_n^{(L-1)}]$.

Note that these differences are negative due to the sorting of $T_n$ in descending order.

3. Initialize "candidate sets" of vectors/scalars, which store neighbor indices/neighbor sums, resp., as empty sets: $\tilde{I} = [\ ], \tilde{S} = [\ ]$.

4. Iteratively perform for $k=2, \ldots, K$ the following two steps:

4.1 Add all possible neighbors of $I^{(k-1)}$ (vectors indices of previously best sum in step k−1) to $\tilde{I}$ and their corresponding sums to $\tilde{S}$, respectively, if they are not already included. A neighbor of $I^{(k-1)}$ is defined as a combination that differs to $I^{(k-1)}$ in only one index position and, hence, there are N neighbors for each index vector. For example, for N=4, the N neighbors of $I^{(1)}$, which was [1,1,1,1], are given by [2,1,1,1], [1,2,1,1], [1,1,2,1], [1,1,1,2]. The corresponding element sums are given by adding the SNR difference from $D_n$ to $S^{(k-1)}$, without the need to compute the complete sum again. This corresponds to subtracting the last contribution, and adding a new (smaller) contribution instead. Note that the elements of the difference vectors $D_n$ can preferably be computed on-the-fly, since not all entries may be needed.

In an embodiment, not all possible neighbors of $I^{(k-1)}$ (vectors indices of previously best sum in step k−1) are added to $\tilde{I}$ and their corresponding sums to $\tilde{S}$ (unless they already exist in these sets), but pruning is applied with the following test:

Define the n-th direct neighbor of $I^{(k-1)}$ as $I^{(k-1)} + e_n$, with $e_n$ being the n-th unit vector, $1 \leq n \leq N$.

Do not add the n-th neighbor $I^{(k-1)} + e_n$ to $\tilde{I}$, if there already exists at least one candidate element in $\tilde{I}$, called $I_c$, which fulfills for all N dimensions the following inequality: $I_c \leq I^{(k-1)} + e_n$. The inequality has to hold for each of the N dimensions.

4.2 Find best combination from $\{\tilde{I}, \tilde{S}\}$, i.e., the neighbor combination with the largest sum. This is the kth best combination and is removed from $\{\tilde{I}, \tilde{S}\}$.

As an example, the first steps for the case of N=4 are stated below:

1. init: $\tilde{I} = [\ ], \tilde{S} = [\ ]$.

2. k=1: best sum: $I^{(1)} = [1, \ldots, 1]$. Assume that $S^{(1)} = \sum_{n=1}^{N} t_n^{(1)} = 60$.

3. k=2: neighbors of $I^{(1)}$: [2,1,1,1], [1,2,1,1], [1,1,2,1], [1,1,1,2]. Corresponding sums are assumed to be 39, 44, 45, 50, i.e., $$t_1^{(2)} + t_2^{(1)} + t_3^{(1)} + t_4^{(1)} = 39, \text{ i.e., } D_1 = [t_1^{(2)} - t_1^{(1)} = 60 - 39 = 21, \ldots]$$

$$t_1^{(1)} + t_2^{(2)} + t_3^{(1)} + t_4^{(1)} = 44, \text{ i.e., } D_2 = [t_2^{(2)} - t_2^{(1)} = 60 - 44 = 16, \ldots]$$

$$t_1^{(1)} + t_2^{(1)} + t_3^{(2)} + t_4^{(1)} = 45, \text{ i.e., } D_3 = [t_3^{(2)} - t_3^{(1)} = 60 - 45 = 15, \ldots]$$

$$t_1^{(1)} + t_2^{(1)} + t_3^{(1)} + t_4^{(2)} = 50, \text{ i.e., } D_4 = [t_4^{(2)} - t_4^{(1)} = 60 - 50 = 10, \ldots]$$

Note that instead if computing the sums, only the differences can be considered, e.g. for the last row, $$t_1^{(1)} + t_2^{(1)} + t_3^{(1)} + t_4^{(2)} = S^{(1)} + t_4^{(2)} - t_4^{(1)},$$

i.e., subtract from the last best sum the influence of the previous entry of the $4^{th}$ row $t_4^{(1)}$, and add the new (smaller) contribution $t_4^{(2)}$ instead to it.

a. Form the "candidate sets" sets by adding these neighbors to $\tilde{I}$ and $\tilde{S}$: $\tilde{I} = [[2,1,1,1], [1,2,1,1], [1,1,2,1], [1,1,1,2]]$,
  $\tilde{S} = [39, 44, 45, 50]$.

b. Select best combination from "candidate sets" as second best combination (k=2):
  $I^{(2)} = [1,1,1,2]$ and $S^{(2)} = 50$, and subtract them from these sets $\tilde{I} = [[2,1,1,1], [1,2,1,1], [1,1,2,1]]$,
  $\tilde{S} = [39, 44, 45]$.

4. k=3: neighbors of $I^{(2)}$: [2,1,1,2], [1,2,1,2], [1,1,2,2], [1,1,1,3].

In an embodiment, not all neighbors will be added to $\tilde{I}$ and $\tilde{S}$ according to the following pruning test:
[2,1,1,2] will always have a weaker overall score than the existing candidate [2,1,1,1], because for all N=4 dimensions, these inequalities have been fulfilled:
2≤2; 1≤1; 1≤1; 1≤2. The last inequality is strictly fulfilled, showing that this candidate uses a better score on the n=4-th dimension, thus resulting in an overall better score. The candidate score is 39, while the potential neighbor will result in a score of 29.
In the same manner, also [1,2,1,2] and [1,1,2,2] will not be added as new neighbors, since better candidates already exist in the set $\tilde{I}$.
The following description does not consider pruning:
  Corresponding sums are:

$$t_1^{(2)}+t_2^{(1)}+t_3^{(1)}+t_{40}^{(2)}=29$$

$$t_1^{(1)}+t_2^{(2)}+t_3^{(1)}+t_{40}^{(2)}=34$$

$$t_1^{(1)}+t_2^{(1)}+t_3^{(2)}+t_{40}^{(2)}=35$$

$$t_1^{(1)}+t_2^{(1)}+t_3^{(1)}+t_{40}^{(3)}=28, \text{ i.e., } D_4=[t_4^{(2)}-t_4^{(1)}=10, t_4^{(3)}-t_4^{(2)}=22 \ldots ].$$

Figure 8A:
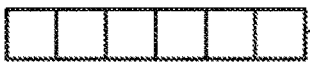

Again, instead of explicitly computing these sums, the elements of $D_n$ may be used, e.g., for the $2^{nd}$ row:

$$t_1^{(1)}+t_2^{(1)}+t_3^{(1)}+t_{40}^{(2)}=S^{(2)}+t_2^{(2)}-t_2^{(1)},$$

i.e., subtract from the last best sum the influence of the previous entry of the $2^{th}$ row $t_2^{(1)}$, and add the new (smaller) contribution $t_2^{(2)}$ instead to it.
  a. Form the "candidate sets" sets by adding these neighbors to $\tilde{I}$ and $\tilde{S}$: $\tilde{I}$=[[2,1,1,1], [1,2,1,1], [1,1,2,1], [2,1,1,2], [1,2,1,2], [1,1,2,2], [1,1,1,3] ],
  $\tilde{S}$=[39, 44, 45, 29, 34, 35, 28].
  5. Select best combination from "candidate sets" as third best combination (k=−3):
  $I^{(3)}$=[1,1,2,1] and $S^{(3)}$=45 and subtract them from these sets
$\tilde{I}$=[[2,1,1,1], [1,2,1,1], [2,1,1,2], [1,2,1,2], [1,1,2,2], [1,1,1,3]],
  $\tilde{S}$=[39, 44, 29, 34, 35, 28].
In another embodiment the processing unit 32 is configured to determine an antenna score per initiator antenna array 11, 12 and per responder antenna array 21, 22 based on the first initiator quality information and the first responder quality information of the antenna beam combinations used in the first training stage. This is illustrated in FIG. 8. FIG. 8A shows an antenna score table 511, 512, 521, 522 per antenna array 11, 12, 21, 22. Said antenna scores, i.e. each score table 511, 512, 521, 522, include a score value per antenna beam used in the first training stage, i.e. the scores for the different antenna beams used by the respective antenna for transmitting a training signal. The determined antenna scores may then be used for selecting the sub-set of antenna beam combinations for use in the second training stage.

Figure 8B:
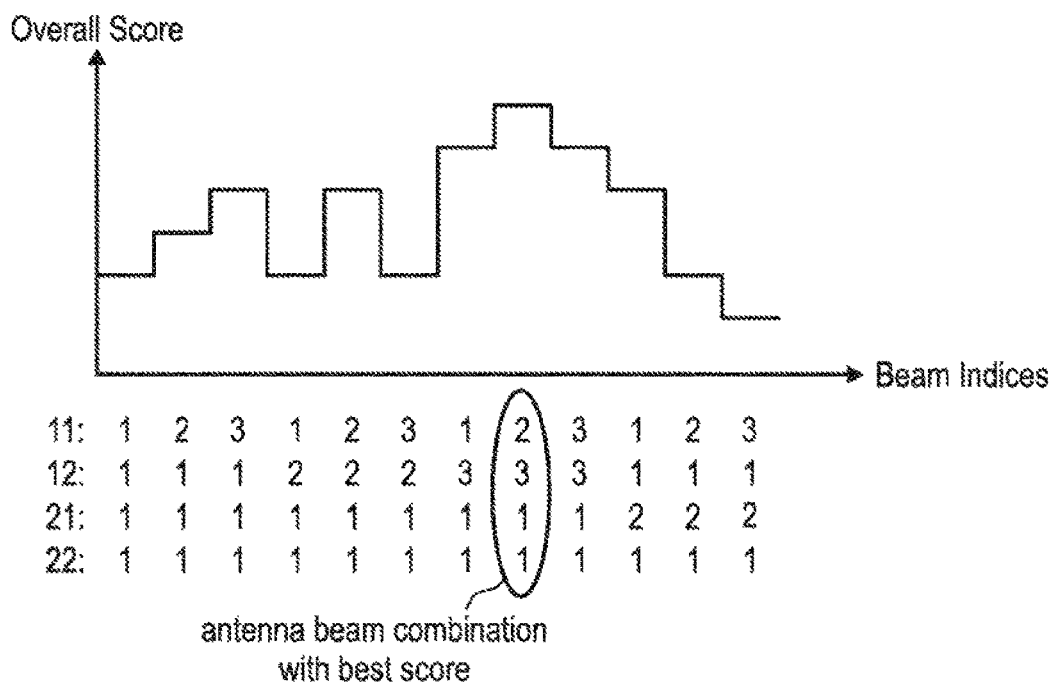

For this purpose an overall score for the different complete antenna beam combinations of antenna beams from the different initiator antenna arrays and the different responder antenna arrays. This is illustrated in FIG. 8B showing the overall score as calculated from the score tables 511, 512, 521, 522 shown in FIG. 8A. The overall score may hereby be calculated as a product, sum, average or linear combination of the antenna scores. The calculated overall scores are then used for selecting the sub-set of antenna beam combinations for use in the second training stage, e.g. by selecting the antenna beam combinations providing the highest overall scores.

In another embodiment the processing unit 32 calculates an overall score for different complete antenna beam combinations of antenna beams from the different initiator antenna arrays and the different responder antenna arrays based on the first initiator quality information and the first responder quality information (e.g. the scores as shown in FIG. 8A) of the antenna beam combinations used in the first training stage and uses the calculated overall scores for selecting the sub-set of antenna beam combinations for use in the second training stage.

In still another embodiment the processing unit 32 sorts the antenna scores (as shown in FIG. 8A) per initiator antenna array and per responder antenna array and selects the sub-set of antenna beam combinations for use in the second training stage based on the sorted antenna scores by selecting the antenna beam combinations having the best scores and/or by use of a probability distribution determined from the antenna scores. Further, the processing unit 32 selects antenna beam combinations for use in the second training stage, in which one or more antenna beams are replaced by one or more of its nearest neighbors in the sorted antenna scores.

In another embodiment the control unit 31 is configured to repeat the first and/or second training stage if the signal level of the communication decreases or the quality of the communication decreases or a trigger is issued or time-out is reached, wherein one or more final antenna beam combinations used earlier are used as a start for selecting antenna beam combinations in the first and/or second training phase.

In another embodiment the control unit 31 stops the first and/or second training stage if a time-out is reached or a predetermined number of antenna combinations have been tested or the improvement with respect to the past iterations and/or with respect to the best obtained metric (such as a second quality information, e.g., MIMO capacity) decreases below a predetermined threshold or the obtained metric exceeds an absolute upper threshold.

Figure 9:
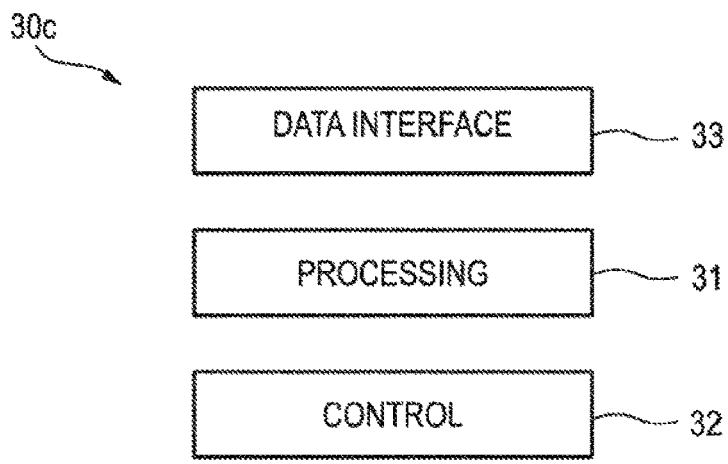
FIG. 9 shows a schematic diagram of another embodiment of a beamforming device according to the present disclosure, FIGS. 10A and B show diagrams illustrating a known SSW feedback frame and a known SSW feedback field, FIGS. 11A and B show diagrams illustrating a modified SSW feedback frame and a modified SSW feedback field, FIGS. 12A and B show diagrams illustrating other embodiments of a modified SSW feedback field, FIGS. 13 A and C show diagrams illustrating another embodiment of a modified SSW feedback frame and SSW ACK frames.

FIG. 9 shows another embodiment of a beamforming device 30c according to the present disclosure. In addition to the control unit 31 and the processing unit 32 it comprises a data interface 33 for—depending on whether the beamforming device is part of the initiator 10 or the responder 20—receiving the first responder quality information and/or the second responder quality information from the responder 20 and/or for transmitting the first initiator quality information and/or the second initiator quality information to the responder 20 and/or for transmitting the first responder quality information and/or the second responder quality information to the initiator 10 and/or for receiving the first initiator quality information and/or the second initiator quality information from the initiator 10.

Said data interface 33 may be configured to transmit responder selection information indicating the responder antenna beams of the selected sub-set of antenna beam combinations to the responder 20 for use in the second training stage and/or to transmit initiator selection information indicating the initiator antenna beams of the selected sub-set of antenna beam combinations to the initiator 10 for use in the second training stage.

In still another embodiment, in the first training stage a set of antenna beams is tested. Then, an interpolation is performed to calculate more antenna beam scores than actually measured, or a small offset is simply added for the next training stage. Subsequently, antenna beam combinations that were not covered by the beam score measurement in the first training stage may be selected for the second training stage, and/or a beam pointing in a slightly different direction next to the optimum may be selected. Hence, in this embodiment, the processing unit selects a sub-set of the antenna beam combinations that are derived from the antenna beam combination used in the first training stage for use in a second training stage.

In the following Sector Sweep (SSW) feedback (FBK) and acknowledgement (ACK) frames for use in the context of the present disclosure will be described. Several possibilities are shown to include more sector feedback information in the SSW feedback and acknowledgement frames without modifying the current lengths of these (as defined in IEEE80.11ad).

One feedback frame, sent from the initiator to the responder comprises but is not limited to an abstract addressing field, a plurality of sectors, each defined by a sector ID or an index determining the position in the sequence of tested beam directions, an antenna or RF chain identifier and a score value, indicative of the first channel quality information e.g., SNR, SINR or RSSI received by the initiator in a second phase of the first training stage. Further fields may be present, as shown in FIGS. 11A, 13B and 13C. The number of sectors, for which feedback is provided, can be either fix and established in a standard or dynamic in which case a value indicative of this must be contained in the feedback frame. The sectors may be included in the decreasing order of the score values. In a proposed feedback frame, the score values are defined in absolute manner, as suggested in FIG. 12A In an alternative feedback frame proposal, the scores are defined in differential manner, whereby the difference between the score values of the sectors signaled in the Selected Sector Field is encoded. According to another aspect, one acknowledgement frame, sent from the responder to the initiator, comprises an abstract addressing field, a plurality of sectors, each defined by a sector ID or an index determining the position in the sequence of tested beam directions, an antenna or RF chain identifier and a score value indicative of the first channel quality information e.g., SNR, SINR or RSSI received by the responder in a first phase of the first training stage.

According to another embodiment it is suggested to replace the long addressing fields currently defined in IEEE80.11ad SSW FBK and ACK frames, with an efficient compressed addressing scheme, and re-use the bits resulting thereof to include indexes and score values corresponding to multiple sectors which were received with best first channel quality information in the first training stage. In this manner, the desired information can be sent without increasing the length of these frames, as defined in IEEE802.11ad.

A possible construction of the SSW feedback frame starts from the legacy SSW FBK Frame shown in FIG. 10A. An option is to include multiple SSW feedback fields as depicted in FIG. 10B in the space made free by replacing the long addressing from IEEE802.11ad with the short addressing used by short SSW frames. In an alternative option, only the most relevant contents of the SSW FBK Field are maintained from IEEE802.11ad together with their bits requirements for each fed back sector and an example of the modified SSW feedback field is depicted in FIG. 11B. In legacy IEEE802.11ad, 16 bits are provided for one sector (for sector ID, DMG antenna and SNR report) for the SSW feedback field as shown in FIG. 10B. The possible modification is shown in FIG. 11, wherein FIG. 11A shows a modified SSW frame and FIG. 11B shows a modified SSW feedback field. With the reduction in addressing, an enlarged SSW FBK Field can be constructed, in which up to 6 sectors could be managed to be signaled. To indicate for which receive antenna the sector and corresponding quality information signaled in the current SSW feedback frame applies, an Antenna ID field may be defined. This can be done e.g., by reusing reserved bits from the Reserved field in FIG. 11B.

The SNR report field may contain the score values (e.g., SNR, SINR or RSSI) obtained after the first training stage. These values can be either absolute (as shown in FIG. 12A) or differential (as shown in FIG. 12B). In the absolute case $i_1, \ldots, i_n$ are the indexes of the sectors received with the best channel quality (i.e., the sectors having the largest score values) and $s_1, \ldots, s_n$ represent the score value of $i_1$ and $i_n$ respectively. For ease of exposition, it can be assumed that the sectors are arranged in the frame in the decreasing order of their score values thus $s_1 \geq s_2$. In the differential case $s_1, \ldots, s_{\Delta n}$ represent the score value of $i_1$, the difference score value $s_{\Delta 2} = s_2 - s_1$ and $s_{\Delta n} = s_n - s_{n-1}$. For the differential score case, the number of bits required may be reduced as the difference between two scores is expected to be significantly smaller than the total range defined in the standard. The length required for the differential scores can be either fixed or signaled. For the second option, the value signaled can be indicative of the number of bits required for the largest relevant score difference. Then all differential scores can be defined to use this length.

A further possible SSW FBK frame may consider variable number of sectors which are fed back. Such a scheme may be useful when one antenna array (e.g., 11 as depicted in FIG. 5) receives a strong training signal whereas a different one (e.g., 12) receives a significantly attenuated one. According to one aspect presented herein, the joint score based on which the beams in the second training stage are chosen, gives preference to the strong sectors. Thus, one antenna array will have more sectors relevant for the joint metric than the other one. To accommodate this, a possible SSW FBK, as depicted in FIG. 15A may additionally contain a field indicating the number of sectors, for which beam index information as well as score values are included.

Another option suggests, for SSW feedback frame and SSW ACK in DTI, to keep the SSW feedback the same length but use the short SSW frame structure as baseline. Similar to the structure shown in FIG. 11, a first possible approach to include information about multiple sectors is to reduce the addressing to the short addressing, used by the short SSW frames and, in the space thus emptied, pack several single sector feedback fields. Each single SSW feedback field contains in this case CDOWN fields. SNR fields and RF chain ID, polling bit and reserved bits which apply to one received sector. The reserved bits can be redefined to provide information about polarization or bandwidth. Alternative to having multiple single SSW feedback fields as previously described, a structure as depicted in FIG. 13A can be used, where only the sector indexes, SNR values and possibly RF Chain IDs are sent for each sector. If the SNR is still 8 bits, one sector requires 19 bits to signal, in the CDOWN field the number of the sector in the sweep phase and in the RF Chain ID field, the corresponding RF chain ID from which the sector was sent. An option for the modified SSW feedback is suggested in FIG. 13B where the CDOWN and RF Chain ID fields are extended to n sectors. The difference between the options shown in FIGS. 13A and 13C are only in the control fields following after BRP Request i.e., FIG. 13A uses the control fields which are defined in IEEE802.11ad SSW FBK Frame after BRP Request, whereas FIG. 13C uses control fields defined in the short SSW frame. However, based on the option shown in FIG. 13A up to 7 sectors may be signaled whereas with option shown in FIG. 13C up to 10 sectors may be signaled. To indicate for which receive antenna the sector and corresponding quality information signaled in the current SSW feedback frame applies, an RX RF Chain ID field may be defined. This field can be present as separate field as shown in FIGS. 13A-C or by reusing bits of the Reserved field. The number of bits left reserved depends on the number of sectors that have been signaled, therefore it is marked in FIGS. 13A-13C as a function "L" of "n".

With the options shown in FIGS. 13A to 13C, information about "n" sectors could be signaled. To keep the same number of bits for the entire frame, reserved bits may be defined or the BRP Request fields may the extended. For example if "n=7" sectors can be fed back, one bit can be either defined as reserved or it can be appended to an extended BRP Request. Due to increased supported features in IEEE 802.11ay, e.g., support for polarization or channel bonding, the content of the BRP Request may be subject to change, thus the latter option of using the remaining bits for redefining this field may be beneficial. Similarly, if e.g., "n=6" sectors are fed back, then the number of remaining bits is 8 and again they can be either defined as reserved or extended BRP. Clearly, values shown here are only meant to give an indication of the number of sectors which may be signaled with this proposal.

The same options as discussed with respect to the relative and absolute or differential score values above may also apply to the options for SSW FBK and SSW ACK in DTI as discussed with respect to FIGS. 13A to 13C with the difference that sector information is in the CDOWN field. This is illustrated in FIG. 14A (showing an SSW feedback field for the absolute case) and FIG. 14B (showing an SSW feedback field for the differential case).

The same options as discussed with respect to signaling a variable number of sectors may also apply. This option is depicted in FIGS. 15B and 15C, as a possible SSW FBK, which additionally contains a field indicating the number of sectors, for which beam index information as well as score values are included. The number of bits required for this can be either obtained due to reductions in differential SNR, reusing reserved bits or various tradeoffs between length of the refinement request fields and the multiple sector related fields.

The three options considered for the SSW FBK frame apply also for the SSW ACK frame, with the principal difference that in the case of the latter multiple sectors which have been received with best first quality information by the responder, together with the corresponding score values are signaled to the initiator.

Having the same frame length as described in 802.11ad can be beneficial for ensuring interoperability with legacy devices, however it may not be enough for the requirements. e.g. of a new standard. Therefore several alternatives to the frame structures presented so far in this disclosure are also shown.

Should the number of sectors received at a device with a channel quality (e.g., SNR/SINR/RSSI) larger than a threshold, exceed the number of sectors which can be included within an SSW FBK frame or should the device be asked to feedback a larger number of sectors that can be included within an SSW FBK or SSW ACK frame, then several solutions can be envisaged. One is to transmit the remaining feedback field information in a separate frame, which is however part of the same control PHY PPDU. An example of such a frame is a control trailer.

More clearly, for multiple sectors the feedback frame depicted in FIG. 11A is kept the same. However, in an additional frame (e.g. a control trailer) a succession of the fields Selected Sectors, DMG Antenna and SNR Report as shown in FIG. 11B, will contain the information on the additional sectors, which could not be accommodated in the SSW feedback frame, together with an indication of their number. Similarly, if the SSW feedback frame is the one used in FIG. 13A the information in the control trailer will contain a succession of the fields CDOWN and SINR Reports as shown in FIG. 14A or 14B and an indication of the number of sectors present. The SNR reports in the control trailer may be either absolute as shown in FIG. 14A or differential as shown in FIG. 14B.

A more robust type of SSW FBK/SSW ACK structure to allow for large number of multiple sectors being fed back can be defined as shown in FIG. 16, where a fragmented bit (field "Fragmented bit") indicates that there are more sectors being signaled in this separate frame e.g., the control trailer. The significance of the other fields present in FIG. 16 is the same as the ones in the SSW frame shown in FIG. 13A.

According to an alternative to the SSW FBK/SSW ACK frame presented in FIG. 16 the SSW frame includes not only the fragmented bit, but also an indication (field "N_sectors") of the number of sectors that will be present in the additional frame e.g., the control trailer or of the total number of sectors that have been received with a good channel quality. An exemplary SSW frame according to this embodiment is shown in FIG. 17.

The solutions using a Fragmented bit to indicate the continuation of the feedback information in a separate frame within the same PPDU has been presented above and in FIGS. 16 and 17 for the proposed SSW FBK/SSW ACK shown in FIG. 13B, however it can be similarly applied to other structures, e.g. the structures shown in FIG. 11.

Alternative to feeding back the remaining sector information in a control trailer, is signaling these sectors in a structure already defined in the current 802.11 ad standard as TxSS Sector List. In this case the fragmented bit and/or N_sectors defined in FIGS. 16, 17 can be defined to signal that the multiple sectors or the respective number of sectors is fed back within this structure.

An alternative proposal implies having a reduced SSW FBK/SSW ACK frame, in which the short addressing is again used, however only information about one sector is included, whereas all the information about the multiple sectors is signaled in the additional structure. e.g., the control trailer. This can be seen as a special case of the frame presented in FIG. 16, where n=1 holds for the SSW Feedback Field shown in FIG. 13B. In this way space within the data field of a control PPDU can be spared for other control information. The Fragmented bit and the indication of number of sectors can be either in separate fields as shown in FIGS. 16, 17 or they can be placed instead of what currently is defined as reserved bits.

An alternative is defining as a reply to a sector sweep SSW FBK/SSW ACK as structures with variable length, which contain among other elements a number of measurements for the sectors that are above a certain threshold, sector identification, antenna identification and value indicating channel quality information e.g., SNR/SINR/RSSI etc.

It should be noted that the ways of providing feedback from the responder to the initiator and/or from the initiator to the responder, in particular the use of SSW feedback frames and/or feedback fields as illustrated in FIGS. 11 to 17, are not restricted to be used in the context of a beamforming device, beamforming method, initiator, responder, communication device and communication system as disclosed herein in the context of FIGS. 1 to 9, but can also be used with other beamforming devices, beamforming methods, initiators, responders, communication devices and communication systems. Generally, in any devices and methods using beamforming for use in a wireless communication system, particularly comprising an initiator and a responder, in which feedback is provided from one communication device to another communication device, such SSW feedback frames and/or feedback fields as disclosed herein may be applied.

The disclosed approaches are well suited to be adopted by further 802.11ay products because they fit the proposed architecture for the future 802.11ay standard in which arrays of sub-arrays are employed and they require only slight modifications to the 802.11ad frame structures and beamforming/training procedures, which is a desired feature for the upcoming 802.11ay standard.

Compared to the known pairwise search algorithm, the disclosed approaches benefit from a significant reduction in complexity which leads to a decrease in time needed to initiate a high rate data link between initiator and responder. The performance of the disclosed approaches is similar as that of pairwise search and both have a negligible loss compared with brute-force full exhaustive search (about 1% or less capacity loss).

Each time, beams are tested (trained), a training sequence is transmitted, and channel estimation may be performed at the receiving end, which is time consuming. Depending on the geometry and other properties of the antenna arrays, the beamwidths may become very small, e.g. 30° directed beams. This in turn results in a large amount of potential sectors, into which the conventional SLS procedure may sweep, e.g. 49 sectors for each antenna array. In a 2×2 case, exhaustive training would then result in $49^4$=approximately 5.76 million training procedures. This number is drastically reduced by the disclosed approaches.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A beamforming device for use in a wireless communication system comprising an initiator and a responder, said beamforming device comprising:
a control unit (31) for controlling the initiator (10) having one or more initiator antenna arrays (11, 12) each comprising two or more initiator antenna elements (110, 120) and/or the responder (20) having one or more responder antenna arrays (21, 22) each comprising two or more responder antenna elements (210, 220), wherein the initiator (10) has at least two initiator antenna arrays (11, 12) and/or the responder (20) has at least two responder antenna arrays (21, 22),
a processing unit (32) for selecting one or more initiator antenna beams per initiator antenna array (11, 12) and one or more responder antenna beams per responder antenna array (21, 22) for use by the initiator (10) and the responder (20) in communicating with each other,
wherein said control unit (31) and said processing unit (32) are configured
i) to control, by the control unit (31) in a first training stage, the initiator antenna elements (110, 120), per pair of initiator antenna array (11, 12) and responder antenna array (21, 22), to transmit a first training signal by successively using different initiator antenna beams of different initiator antenna beam directions and to receive a first training signal transmitted by the responder antenna array (21, 22) by successively using different responder antenna beams of different responder antenna beam directions,
ii) to select, by the processing unit (32), a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used,
iii) to control, by the control unit (31) in the second training stage, the initiator antenna elements (110, 120) of the initiator antenna arrays (11, 12) to transmit, in particular commonly (simultaneously or successively), a second training signal by successively using different initiator antenna beams of different initiator antenna beam directions according to one or more of the selected antenna beam combinations, and/or to receive a second training signal transmitted, in particular commonly (simultaneously or successively), by the responder antenna elements (210, 220) of the one or more responder antenna arrays (21, 22) by successively using different responder antenna beams of different responder antenna beam directions according to one or more of the selected antenna beam combinations, and iv) to select, by the processing unit (32), a final antenna beam combination for use by the initiator (10) and the responder (20) in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

2. The beamforming device as defined in embodiment 1, wherein said control unit (31) is configured to control, in the first training stage, the initiator antenna elements (110, 120), per pair of initiator antenna array (11, 12) and responder antenna array (21, 22),
  to transmit the first training signal by successively using different initiator antenna beams of different beam directions to a responder antenna array configured to receive the first training signal with an omnidirectional or wide-angle responder antenna beam and
  to receive a first training signal transmitted by a responder antenna array (21, 22) by successively using different responder antenna beams of different beam directions, wherein the initiator antenna array (11, 12) is configured to receive the first training signal with an omnidirectional or wide-angle initiator antenna beam.

3. The beamforming device as defined in any preceding embodiment,
wherein said control unit (31) is configured to control, in the first training stage, the initiator antenna elements (110, 120), per pair of initiator antenna array (11, 12) and responder antenna array (21, 22),
  to transmit the first training signal by successively using different initiator antenna beams of different initiator antenna beam directions to a responder antenna configured to receive the first training signal with a directed responder antenna beam, wherein the successive transmission of the first training signal with different initiator antenna beams of different initiator antenna beam directions is repeated multiple times, wherein in each iteration one or more different directed responder antenna beams are used for reception, and
  to receive the first training signal transmitted from a responder antenna array (21, 22) by successively using different responder antenna beams of different responder antenna beam directions, wherein the initiator antenna array (11, 12) is configured to receive the first training signal with a directed initiator antenna beam, wherein the successive transmission of the first training signal with different responder antenna beams of different responder antenna beam directions is repeated multiple times, wherein in each iteration one or more different directed initiator antenna beams are used for reception.

4. The beamforming device as defined in any preceding embodiment,
wherein said control unit (31) is configured to control, in a first training stage, the initiator antenna elements (110, 120), per two or more pairs of initiator antenna arrays (11, 12) and responder antenna arrays (21, 22),
  to transmit a first training signal successively with different initiator antenna beams of different initiator antenna beam directions to a responder antenna, wherein the initiator antenna elements of different initiator antenna arrays simultaneously transmit orthogonal first training signals and/or over different polarization, and
  to receive a first training signal transmitted from a responder antenna array (21, 22) successively with different responder antenna beams of different responder antenna beam directions, wherein the responder antenna elements of different responder antenna arrays simultaneously transmit orthogonal first training signals and/or over different polarization.

5. The beamforming device as defined in any preceding embodiment,
wherein said control unit (31) and said processing unit (32) are configured
  to control, by the control unit (31), in a first phase of the first and/or second training stage, the initiator antenna elements (110, 120) to transmit the training signal by successively using different initiator antenna beams having a first beam width and/or the responder antenna elements (210, 220) to receive the training signal by successively using different responder antenna beams having a first beam width,
  to select, by the processing unit (32), at least part of the antenna beam combinations of the sub-set of antenna beam combinations for use in a second phase of the same training stage based on the initiator antenna beam direction of the initiator antenna beam selected based on the responder quality information, and
  to control, by the control unit (31), in the second phase, the initiator antenna elements (110, 120) to transmit the training signal by successively using different initiator antenna beams having a second beam width different from the first beam width used in the first phase and having an initiator antenna beam direction identical or similar as the initiator antenna beam direction of the initiator antenna beam providing the best first initiator quality information in the first phase and/or the responder antenna elements (210, 220) to receive the training signal by successively using different responder antenna beams having a second beam width different from the first beam width used in the first phase and having a responder antenna beam direction identical or similar as the responder antenna beam direction of the responder antenna beam providing the best first responder quality information in the first phase.

6. A beamforming device for use in a wireless communication system comprising an initiator and a responder, said beamforming device comprising:
  a control unit (31) for controlling the initiator (10) having one or more initiator antenna arrays (11, 12) each comprising two or more initiator antenna elements (110, 120) and/or the responder (20) having one or more responder antenna arrays (21, 22) each comprising two or more responder antenna elements (210, 220), wherein the initiator (10) has at least two initiator antenna arrays (11, 12) and/or the responder (20) has at least two responder antenna arrays (21, 22), a processing unit (32) for selecting one or more initiator antenna beams per initiator antenna array (11, 12) and one or more responder antenna beams per responder antenna array (21, 22) for use by the initiator (10) and the responder (20) in communicating with each other, wherein said control unit (31) and said processing unit (32) are configured i) to control, by the control unit (31) in a first training stage, the responder antenna elements (210, 220), per pair of initiator antenna array (11, 12) and responder antenna array (21, 22) to receive a first training signal transmitted by the initiator antenna array (11, 12) by successively using different initiator antenna beams of different initiator antenna beam directions and to transmit a first training signal by successively using different responder antenna beams of different responder antenna beam directions, ii) to select, by the processing unit (32), a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, iii) to control, by the control unit (31) in the second training stage, the responder antenna elements (210, 220) of the responder antenna arrays (21, 22) to receive a second training signal transmitted, in particular commonly (simultaneously or successively), by the initiator antenna elements (110, 120) of the one or more initiator antenna arrays (11, 12) by successively using different initiator antenna beams of different initiator antenna beam directions according to one or more of the selected antenna beam combinations and/or to transmit, in particular commonly (simultaneously or successively), a second training signal by successively using different initiator antenna beams of different initiator antenna beam directions according to one or more of the selected antenna beam combinations, and iv) to select, by the processing unit (32), a final antenna beam combination for use by the initiator (10) and the responder (20) in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

7. The beamforming device as defined in any preceding embodiment,
wherein said processing unit (32) is configured to select, per pair of initiator antenna array (11, 12) and responder antenna array (21, 22), combinations of initiator antenna beams and responder antenna beams to be used in the first training stage by use of a genetic or evolutionary search algorithm.

8. The beamforming device as defined in any preceding embodiment,
wherein the first initiator quality information and the first responder quality information is information indicating signal to noise ratio, signal to noise-and-interference ratio, receive signal strength indication, the estimated capacity, received electric or magnetic field strength or delay spread per pair of initiator antenna array (11, 12) and responder antenna array (21, 22) and per antenna beam.

9. The beamforming device as defined in any preceding embodiment,
wherein the second initiator quality information and/or the second responder quality information is information indicating the estimated capacity, sum of singular values, or condition number of a channel matrix per antenna beam combination.

10. The beamforming device as defined in any preceding embodiment,
wherein said processing unit (32) is configured to determine an antenna score per initiator antenna array and per responder antenna array (21, 22) based on the first initiator quality information and the first responder quality information of the antenna beam combinations used in the first training stage, said antenna scores including a score value per antenna beam used in the first training stage, and to use the determined antenna scores for selecting the sub-set of antenna beam combinations for use in the second training stage.

11. The beamforming device as defined in embodiment 10,
wherein said processing unit (32) is configured to calculate an overall score for the different complete antenna beam combinations of antenna beams from the different initiator antenna arrays and the different responder antenna arrays as a product, sum, average or linear combination of the antenna scores and to use the calculated overall scores for selecting the sub-set of antenna beam combinations for use in the second training stage.

12. The beamforming device as defined in any preceding embodiment,
wherein said processing unit (32) is configured to calculate an overall score for different complete antenna beam combinations of antenna beams from the different initiator antenna arrays and the different responder antenna arrays based on the first initiator quality information and the first responder quality information of the antenna beam combinations used in the first training stage and to use the calculated overall scores for selecting the sub-set of antenna beam combinations for use in the second training stage.

13. The beamforming device as defined in embodiment 10,
wherein said processing unit (32) is configured to sort the antenna scores per initiator antenna array and per responder antenna array and to select the sub-set of antenna beam combinations for use in the second training stage based on the sorted antenna scores by selecting the antenna beam combinations having the best scores and/or by use of a probability distribution determined from the antenna scores, and to select antenna beam combinations for use in the second training stage, in which one or more antenna beams are replaced by one or more of its nearest neighbors in the sorted antenna scores.

14. The beamforming device as defined in any preceding embodiment,
wherein said processing unit (32) is configured to select the sub-set of antenna beam combinations for use in the second training stage by use of a genetic or evolutionary search algorithm.

15. The beamforming device as defined in embodiment 14, wherein said processing unit (32) is configured to select part of the antenna beam combinations of the sub-set for use in the second training stage randomly, in particular by use of a uniform or non-uniform probability distribution.

16. The beamforming device as defined in embodiment 14, wherein said processing unit (32) is configured to determine, in each iteration of step iv) in the second training stage, the second responder quality information and/or the second initiator quality information, to determine an overall score for the overall antenna beam combination used in said iteration and to compare the determined overall score with the overall score of the previous iterations.

17. The beamforming device as defined in embodiment 16, wherein said processing unit (32) is configured to set, in each iteration, the overall antenna beam combination having the best overall score up to said iteration, as preliminary best antenna beam combination and to select the overall antenna beam combination to be used in the next iteration based on the preliminary best antenna beam combination.

18. The beamforming device as defined in any preceding embodiment,
wherein said processing unit (32) is configured to use the beam direction of the initiator antenna beam and/or the responder antenna beam providing the best initiator quality information and the best responder quality information for selecting antenna beam combinations used subsequently in the first training stage and/or the second training stage.

19. The beamforming device as defined in any preceding embodiment,
wherein said control unit (31) is configured to repeat the first and/or second training stage if the signal level of the communication decreases or the quality of the communication decreases or a trigger is issued or time-out is reached, wherein one or more final antenna beam combinations used earlier are used as a start for selecting antenna beam combinations in the first and/or second training phase.

20. The beamforming device as defined in any preceding embodiment,
wherein said control unit (31) is configured to stop the first and/or second training stage if a time-out is reached or a predetermined number of antenna combinations have been tested the improvement with respect to the past iterations and/or with respect to the best obtained metric decreases below a predetermined threshold or the obtained metric exceeds an absolute upper threshold.

21. The beamforming device as defined in any preceding embodiment,
further comprising a data interface (33) for receiving the first responder quality information and/or the second responder quality information from the responder (20) and/or for transmitting the first initiator quality information and/or the second initiator quality information to the responder (20) and/or for transmitting the first responder quality information and/or the second responder quality information to the initiator (10) and/or for receiving the first initiator quality information and/or the second initiator quality information from the initiator (10).

22. The beamforming device as defined in embodiment 21, wherein said data interface (33) is configured to transmit responder selection information indicating the responder antenna beams of the selected sub-set of antenna beam combinations to the responder (20) for use in the second training stage and/or to transmit initiator selection information indicating the initiator antenna beams of the selected sub-set of antenna beam combinations to the initiator (10) for use in the second training stage.

23. The beamforming device as defined in embodiment 21 or 22,
wherein control unit (31) is configured to control said initiator antenna elements (110, 120) to transmit initiator quality information and/or responder selection information within or along with first and/or second training signals transmitted to the responder (20) and/or to control said responder antenna elements (210, 220) to transmit responder quality information and/or initiator selection information within or along with first and/or second training signals transmitted to the initiator (10).

24. The beamforming device as defined in any preceding embodiment,
wherein said processing unit (32) is configured to calculate one or more of the first responder quality information, the second responder quality information, the first initiator quality information and the second initiator quality information.

25. A beamforming method for use in a wireless communication system comprising an initiator and a responder, the initiator (10) having one or more initiator antenna arrays (11, 12) each comprising two or more initiator antenna elements (110, 120) and/or the responder (20) having one or more responder antenna arrays (21, 22) each comprising two or more responder antenna elements (210, 220), wherein the initiator (10) has at least two initiator antenna arrays (11, 12) and/or the responder (20) has at least two responder antenna arrays (21, 22),
said beamforming method being configured for selecting one or more initiator antenna beams per initiator antenna array (11, 12) and one or more responder antenna beams per responder antenna array (21, 22) for use by the initiator (10) and the responder (20) in communicating with each other,
said beamforming method comprising:
i) controlling, in a first training stage, the initiator antenna elements (110, 120), per pair of initiator antenna array (11, 12) and responder antenna array (21, 22), to transmit a first training signal by successively using different initiator antenna beams of different initiator antenna beam directions and to receive a first training signal transmitted by the responder antenna array (21, 22) by successively using different responder antenna beams of different responder antenna beam directions,
ii) selecting a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, iii) controlling, in the second training stage, the initiator antenna elements (110, 120) of the initiator antenna arrays (11, 12) to transmit, in particular commonly (simultaneously or successively), a second training signal by successively using different initiator antenna beams of different initiator antenna beam directions according to the selected antenna beam combinations, and/or to receive a second training signal transmitted, in particular commonly (simultaneously or successively), by the responder antenna elements (210, 220) of the one or more responder antenna arrays (21, 22) by successively using different responder antenna beams of different responder antenna beam directions according to the selected antenna beam combinations, and iv) selecting a final antenna beam combination for use by the initiator (10) and the responder (20) in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

26. A beamforming method for use in a wireless communication system comprising an initiator and a responder, the initiator (10) having one or more initiator antenna arrays (11, 12) each comprising two or more initiator antenna elements (110, 120) and/or the responder (20) having one or more responder antenna arrays (21, 22) each comprising two or more responder antenna elements (210, 220), wherein the initiator (10) has at least two initiator antenna arrays (11, 12) and/or the responder (20) has at least two responder antenna arrays (21, 22), said beamforming method being configured for selecting one or more initiator antenna beams per initiator antenna array (11, 12) and one or more responder antenna beams per responder antenna array (21, 22) for use by the initiator (10) and the responder (20) in communicating with each other, said beamforming method comprising:

i) controlling, in a first training stage, the responder antenna elements (210, 220), per pair of initiator antenna array (11, 12) and responder antenna array (21, 22) to receive a first training signal transmitted by the initiator antenna array (11, 12) by successively using different initiator antenna beams of different initiator antenna beam directions and to transmit a first training signal by successively using different responder antenna beams of different responder antenna beam directions, ii) selecting a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, iii) controlling, in the second training stage, the responder antenna elements (210, 220) of the responder antenna arrays (21, 22) to receive a second training signal transmitted, in particular commonly (simultaneously or successively), by the initiator antenna elements (110, 120) of the one or more initiator antenna arrays (11, 12) by successively using different initiator antenna beams of different initiator antenna beam directions according to the selected antenna beam combinations and/or to transmit, in particular commonly (simultaneously or successively), a second training signal by successively using different initiator antenna beams of different initiator antenna beam directions according to the selected antenna beam combinations, and iv) selecting a final antenna beam combination for use by the initiator (10) and the responder (20) in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

27. A communication device (40, 41) for communicating with another communication device in a wireless communication system, said communication device comprising:

one or more antenna arrays (11, 12, 21, 22) each comprising two or more antenna elements (110, 120, 210, 220), and a beamforming device (30, 30a, 30b) as defined in any one of embodiments 1 to 24.

28. A communication system including a beamforming device (30, 30a, 30b) as defined in any one of embodiments 1 to 24 and two or more communication devices (10, 20), each having at least one antenna array (11, 12, 21, 22) each comprising two or more antenna elements (110, 120, 210, 220), wherein at least one communication device has at least two antenna arrays.

29. A non-transitory computer-readable recording medium that stores therein a computer program product, which, when executed by a processor, causes the beamforming method according to embodiment 25 or 26 to be performed.

30. A computer program comprising program code means for causing a computer to perform the steps of said method according to embodiment 25 or 26 when said computer program is carried out on a computer.

31. The beamforming device as defined in embodiment 6, wherein said control unit (31) is configured to control, in the first training stage, the responder antenna elements (210, 220), per pair of initiator antenna array (11, 12) and responder antenna array (21, 22), to transmit the first training signal by successively using different responder antenna beams of different beam directions to an initiator antenna array configured to receive the first training signal with an omnidirectional or wide-angle initiator antenna beam and to receive a first training signal transmitted by an initiator antenna array (11, 12) by successively using different initiator antenna beams of different beam directions, wherein the responder antenna array (21, 22) is configured to receive the first training signal with an omnidirectional or wide-angle responder antenna beam.

32. The beamforming device as defined in embodiment 6 or 31,
wherein said control unit (31) is configured to control, in the first training stage, the responder antenna elements (210, 220), per pair of initiator antenna array (11, 12) and responder antenna array (21, 22),
   to transmit the first training signal by successively using different responder antenna beams of different responder antenna beam directions to an initiator antenna configured to receive the first training signal with a directed initiator antenna beam, wherein the successive transmission of the first training signal with different responder antenna beams of different responder antenna beam directions is repeated multiple times, wherein in each iteration one or more different directed initiator antenna beams are used for reception, and
   to receive the first training signal transmitted from an initiator antenna array (11, 12) by successively using different initiator antenna beams of different initiator antenna beam directions, wherein the responder antenna array (21, 22) is configured to receive the first training signal with a directed responder antenna beam, wherein the successive transmission of the first training signal with different initiator antenna beams of different initiator antenna beam directions is repeated multiple times, wherein in each iteration one or more different directed responder antenna beams are used for reception.

33. The beamforming device as defined in embodiment 6, 31 or 32,
wherein said control unit (31) is configured to control, in a first training stage, the responder antenna elements (210, 220), per two or more pairs of initiator antenna arrays (11, 12) and responder antenna arrays (21, 22),
   to transmit a first training signal successively with different responder antenna beams of different responder antenna beam directions to an initiator antenna, wherein the responder antenna elements of different responder antenna arrays simultaneously transmit orthogonal first training signals and/or over different polarization, and
   to receive a first training signal transmitted from an initiator antenna array (11, 12) successively with different initiator antenna beams of different initiator antenna beam directions, wherein the initiator antenna elements of different initiator antenna arrays simultaneously transmit orthogonal first training signals and/or over different polarization.

34. The beamforming device as defined in embodiment 6, 31, 32, 33 or 34,
wherein said control unit (31) and said processing unit (32) are configured
   to control, by the control unit (31), in a first phase of the first and/or second training stage, the responder antenna elements (210, 220) to transmit the training signal by successively using different responder antenna beams having a first beam width and/or the initiator antenna elements (110, 120) to receive the training signal by successively using different initiator antenna beams having a first beam width,
   to select, by the processing unit (32), at least part of the antenna beam combinations of the sub-set of antenna beam combinations for use in a second phase of the same training stage based on the responder antenna beam direction of the responder antenna beam selected based on the initiator quality information, and
   to control, by the control unit (31), in the second phase, the responder antenna elements (210, 220) to transmit the training signal by successively using different responder antenna beams having a second beam width different from the first beam width used in the first phase and having a responder antenna beam direction identical or similar as the responder antenna beam direction of the responder antenna beam providing the best first responder quality information in the first phase and/or the initiator antenna elements (110, 120) to receive the training signal by successively using different initiator antenna beams having a second beam width different from the first beam width used in the first phase and having an initiator antenna beam direction identical or similar as the initiator antenna beam direction of the initiator antenna beam providing the best first initiator quality information in the first phase.

35. The beamforming device as defined in embodiment 1, wherein said control unit (31) is configured to control, in the first training stage, the initiator antenna elements (110, 120), per pair of initiator antenna array (11, 12) and responder antenna array (21, 22),
   to transmit the first training signal by successively using different initiator antenna beams of different beam directions to a responder antenna array configured to receive the first training signal with an omnidirectional or wide-angle responder antenna beam and
   subsequently to transmit a first training signal with an (e.g. omnidirectional or wide-angle) initiator antenna beam to a responder antenna array configured to receive the first training signal by successively using different responder antenna beams of different beam directions.

36. The beamforming device as defined in embodiment 6, wherein said control unit (31) is configured to control, in the first training stage, the responder antenna elements (210, 220), per pair of initiator antenna array (11, 12) and responder antenna array (21, 22),
   to transmit the first training signal by successively using different responder antenna beams of different beam directions to an initiator antenna array configured to receive the first training signal with an omnidirectional or wide-angle initiator antenna beam and
   subsequently to transmit a first training signal with a (e.g. omnidirectional or wide-angle) responder antenna beam to an initiator antenna array configured to receive the first training signal by successively using different initiator antenna beams of different beam directions.

37. The beamforming device as defined in embodiment 22, wherein said data interface (33) is configured to transmit at least part of said responder selection information and/or to transmit at least part of said initiator selection information by use of an additional frame, in particular a control trailer, and wherein an indicator is used to indicate the use of an additional frame and/or the amount of information in the additional frame.

38. A beamforming device for use in a wireless communication system, wherein said beamforming device is configured to send feedback by use of SSW feedback frames and/or SSW feedback fields as disclosed herein, in particular as disclosed in any one of FIGS. 11-17.

39. The beamforming device as defined in embodiment 38, said beamforming device being configured for use in a wireless communication system comprising an initiator and a responder, said beamforming device comprising:
  a control unit (31) for controlling the initiator (10) having one or more initiator antenna arrays (11, 12) each comprising two or more initiator antenna elements (110, 120) and/or the responder (20) having one or more responder antenna arrays (21, 22) each comprising two or more responder antenna elements (210, 220), wherein the initiator (10) has at least two initiator antenna arrays (11, 12) and/or the responder (20) has at least two responder antenna arrays (21, 22),
  a processing unit (32) for selecting one or more initiator antenna beams per initiator antenna array (11, 12) and one or more responder antenna beams per responder antenna array (21, 22) for use by the initiator (10) and the responder (20) in communicating with each other.

40. A beamforming method for use in a wireless communication system, wherein said beamforming method is configured to send feedback by use of SSW feedback frames and/or SSW feedback fields as disclosed herein, in particular as disclosed in any one of FIGS. 11-17.

The invention claimed is:

1. A beamforming device for use in a wireless communication system comprising an initiator and a responder, said beamforming device comprising:
  circuitry configured to
    control the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays,
    select one or more initiator antenna beams per initiator antenna array and one or more responder antenna beams per responder antenna array for use by the initiator and the responder in communicating with each other,
    control, in a first training stage, the initiator antenna elements, per pair of initiator antenna array and responder antenna array, to transmit a first training signal by successively using different initiator antenna beams of different initiator antenna beam directions and to receive a first training signal transmitted by the responder antenna array by successively using different responder antenna beams of different responder antenna beam directions,
    select a sub-set of antenna beam combinations that have been used in the first training stage or are derived from an antenna beam combination used in the first training stage, for use in a second training stage, wherein at least some of the antenna beam combinations of said sub-set are selected by use of first responder quality information indicating a quality of reception of the first training signals by a respective responder antenna array for the different initiator antenna beams used by a respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for different pairs of initiator antenna arrays and responder antenna arrays of the first training stage is used, wherein the circuitry for selecting the sub-set of antenna beam combinations for use in the second training stage includes testing a best obtained beam with crossover variants, wherein during each iteration of testing one or more of random beams for the initiator antenna arrays and highest quality obtained beams at the responder are tested, random beams for the responder antenna arrays and highest quality beams at the initiator are tested, random beams for both initiator and responder are tested, and the highest quality obtained beams are tested, wherein the random beams are generated such that beams which have obtained a high score in the first training phase are more likely to be chosen,
    control, in the second training stage, the initiator antenna elements of the initiator antenna arrays to commonly transmit a second training signal by successively using different initiator antenna beams of different initiator antenna beam directions according to one or more of the selected antenna beam combinations, and/or to receive a second training signal commonly transmitted by the responder antenna elements of the one or more responder antenna arrays by successively using different responder antenna beams of different responder antenna beam directions according to one or more of the selected antenna beam combinations, and
    select a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

2. The beamforming device as claimed in claim 1, wherein the circuitry is further configured to
  control, in the first training stage, the initiator antenna elements, per pair of initiator antenna array and responder antenna array,
  transmit the first training signal by successively using different initiator antenna beams of different beam directions to a responder antenna array configured to receive the first training signal with an omnidirectional or wide-angle responder antenna beam, and
  receive a first training signal transmitted by a responder antenna array by successively using different responder antenna beams of different beam directions, wherein the initiator antenna array is configured to receive the first training signal with an omnidirectional or wide-angle initiator antenna beam.

3. The beamforming device as claimed in claim 1, wherein the circuitry is further configured to
  control, in the first training stage, the initiator antenna elements, per pair of initiator antenna array and responder antenna array,
  transmit the first training signal by successively using different initiator antenna beams of different initiator antenna beam directions to a responder antenna configured to receive the first training signal with a directed responder antenna beam, wherein the successive transmission of the first training signal with different initiator antenna beams of different initiator antenna beam directions is repeated multiple times, wherein in each iteration one or more different directed responder antenna beams are used for reception, and receive the first training signal transmitted from a responder antenna array by successively using different responder antenna beams of different responder antenna beam directions, wherein the initiator antenna array is configured to receive the first training signal with a directed initiator antenna beam, wherein the successive transmission of the first training signal with different responder antenna beams of different responder antenna beam directions is repeated multiple times, wherein in each iteration one or more different directed initiator antenna beams are used for reception.

4. The beamforming device as claimed in claim 1, wherein the circuitry is further configured to control, in a first training stage, the initiator antenna elements, per two or more pairs of initiator antenna arrays and responder antenna arrays, transmit a first training signal successively with different initiator antenna beams of different initiator antenna beam directions to a responder antenna, wherein the initiator antenna elements of different initiator antenna arrays simultaneously transmit orthogonal first training signals and/or over different polarization, and receive a first training signal transmitted from a responder antenna array successively with different responder antenna beams of different responder antenna beam directions, wherein the responder antenna elements of different responder antenna arrays simultaneously transmit orthogonal first training signals and/or over different polarization.

5. The beamforming device as claimed in claim 1, wherein the circuitry is further configured to control in a first phase of the first and/or second training stage, the initiator antenna elements to transmit the training signal by successively using different initiator antenna beams having a first beam width and/or the responder antenna elements to receive the training signal by successively using different responder antenna beams having a first beam width, select at least part of the antenna beam combinations of the sub-set of antenna beam combinations for use in a second phase of a same training stage based on the initiator antenna beam direction of the initiator antenna beam selected based on the responder quality information, and control in the second phase, the initiator antenna elements to transmit the training signal by successively using different initiator antenna beams having a second beam width different from the first beam width used in the first phase and having an initiator antenna beam direction identical or similar as the initiator antenna beam direction of the initiator antenna beam providing a best first initiator quality information in the first phase and/or the responder antenna elements to receive the training signal by successively using different responder antenna beams having a second beam width different from the first beam width used in the first phase and having a responder antenna beam direction identical or similar as the responder antenna beam direction of the responder antenna beam providing the best first responder quality information in the first phase.

6. The beamforming device as claimed in claim 1, wherein the circuitry is configured to select, per pair of initiator antenna array and responder antenna array, combinations of initiator antenna beams and responder antenna beams to be used in the first training stage by use of a genetic or evolutionary search algorithm.

7. The beamforming device as claimed in claim 1, wherein the first initiator quality information and the first responder quality information is information indicating signal to noise ratio, signal to noise-and-interference ratio, receive signal strength indication, an estimated capacity, received electric or magnetic field strength or delay spread per pair of initiator antenna array and responder antenna array and per antenna beam.

8. The beamforming device as claimed in claim 1, wherein the second initiator quality information and/or the second responder quality information is information indicating the estimated capacity, sum of singular values, or condition number of a channel matrix per antenna beam combination.

9. The beamforming device as claimed in claim 1, wherein the circuitry is configured to determine an antenna score per initiator antenna array and per responder antenna array based on the first initiator quality information and the first responder quality information of the antenna beam combinations used in the first training stage, said antenna scores including a score value per antenna beam used in the first training stage, and to use the determined antenna scores for selecting the sub-set of antenna beam combinations for use in the second training stage.

10. The beamforming device as claimed in claim 9, wherein the circuitry is configured to calculate an overall score for different complete antenna beam combinations of antenna beams from the different initiator antenna arrays and the different responder antenna arrays as a product, sum, average or linear combination of the antenna scores and to use the calculated overall scores for selecting the sub-set of antenna beam combinations for use in the second training stage.

11. The beamforming device as claimed in claim 9, wherein the circuitry is configured to sort the antenna scores per initiator antenna array and per responder antenna array and to select the sub-set of antenna beam combinations for use in the second training stage based on the sorted antenna scores by selecting the antenna beam combinations having a best score and/or by use of a probability distribution determined from the antenna scores, and to select antenna beam combinations for use in the second training stage, in which one or more antenna beams are replaced by one or more of its nearest neighbors in the sorted antenna scores or by one or more antenna beams, randomly selected according to the already determined probability distribution function.

12. The beamforming device as claimed in claim 1, wherein the circuitry is configured to calculate an overall score for different complete antenna beam combinations of antenna beams from the different initiator antenna arrays and the different responder antenna arrays based on the first initiator quality information and the first responder quality information of the antenna beam combinations used in the first training stage and to use the calculated overall scores for selecting the sub-set of antenna beam combinations for use in the second training stage.

13. The beamforming device as claimed in claim 1, wherein the circuitry is configured to select the sub-set of antenna beam combinations for use in the second training stage by use of a genetic or evolutionary search algorithm.

14. The beamforming device as claimed in claim 13, wherein the circuitry is configured to select part of the antenna beam combinations of the sub-set for use in the second training stage randomly, in particular by use of a uniform or non-uniform probability distribution.

15. The beamforming device as claimed in claim 13, wherein the circuitry is configured to determine, in each iteration in the second training stage, the second responder quality information and/or the second initiator quality information, to determine an overall score for an overall antenna beam combination used in said iteration and to compare the determined overall score with the overall score of the previous iterations.

16. The beamforming device as claimed in claim 15, wherein the circuitry is configured to set, in each iteration, the overall antenna beam combination having the best overall score up to said iteration, as preliminary best antenna beam combination and to select the overall antenna beam combination to be used in a next iteration based on the preliminary best antenna beam combination.

17. The beamforming device as claimed in claim 1, wherein the circuitry is configured to use the beam direction of the initiator antenna beam and/or the responder antenna beam providing the best initiator quality information and the best responder quality information for selecting antenna beam combinations used subsequently in the first training stage and/or the second training stage.

18. The beamforming device as claimed in claim 1, wherein the circuitry is configured to repeat the first and/or second training stage if a signal level of the communication decreases or the quality of the communication decreases or a trigger is issued or time-out is reached, wherein one or more final antenna beam combinations used earlier are used as a start for selecting antenna beam combinations in the first and/or second training phase.

19. The beamforming device as claimed in claim 1, wherein the circuitry is configured to stop the first and/or second training stage if a time-out is reached or a predetermined number of antenna combinations have been tested or the improvement with respect to past iterations and/or with respect to best obtained metric decreases below a predetermined threshold or the obtained metric exceeds an absolute upper threshold.

20. The beamforming device as claimed in claim 1, further comprising a data interface for at least one of receiving the first responder quality information receiving the second responder quality information from the responder, transmitting the first initiator quality information, transmitting the second initiator quality information to the responder, transmitting the first responder quality information, transmitting the second responder quality information to the initiator, receiving the first initiator quality information, and receiving the second initiator quality information from the initiator.

21. The beamforming device as claimed in claim 20, wherein said data interface is configured to transmit at least one of responder selection information indicating the responder antenna beams of the selected sub-set of antenna beam combinations to the responder for use in the second training stage and initiator selection information indicating the initiator antenna beams of the selected sub-set of antenna beam combinations to the initiator for use in the second training stage.

22. The beamforming device as claimed in claim 21, wherein said data interface is configured to transmit at least part of said responder selection information and/or to transmit at least part of said initiator selection information by use of an additional frame, in particular a control trailer, and wherein an indicator is used to indicate the use of an additional frame and/or an amount of information in the additional frame.

23. The beamforming device as claimed in claim 20, wherein the circuitry is configured to control at least one of said initiator antenna elements to transmit initiator quality information and/or responder selection information within or along with first, second training signals transmitted to the responder, said responder antenna elements to transmit responder quality information, initiator selection information within or along with first, and second training signals transmitted to the initiator.

24. The beamforming device as claimed in claim 1, wherein the circuitry is configured to calculate one or more of the first responder quality information, the second responder quality information, the first initiator quality information and the second initiator quality information.

25. The beamforming device as claimed in claim 1, wherein the circuitry is configured to control, in the first training stage, the initiator antenna elements, per pair of initiator antenna array and responder antenna array, transmit the first training signal by successively using different initiator antenna beams of different beam directions to a responder antenna array configured to receive the first training signal with an omnidirectional or wide-angle responder antenna beam, and subsequently transmit a first training signal with an initiator antenna beam to a responder antenna array configured to receive the first training signal by successively using different responder antenna beams of different beam directions.

26. A beamforming device for use in a wireless communication system comprising an initiator and a responder, said beamforming device comprising:
circuitry configured to
control the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays,
select one or more initiator antenna beams per initiator antenna array and one or more responder antenna beams per responder antenna array for use by the initiator and the responder in communicating with each other,
control, in a first training stage, the responder antenna elements, per pair of initiator antenna array and responder antenna array to receive a first training signal transmitted by the initiator antenna array by successively using different initiator antenna beams of different initiator antenna beam directions and to transmit a first training signal by successively using different responder antenna beams of different responder antenna beam directions, select a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, wherein the circuitry for selecting the sub-set of antenna beam combinations for use in the second training stage includes testing a best obtained beam with crossover variants, wherein during each iteration of testing one or more of random beams for the initiator antenna arrays and highest quality obtained beams at the responder are tested, random beams for the responder antenna arrays and highest quality beams at the initiator are tested, random beams for both initiator and responder are tested, and the highest quality obtained beams are tested, wherein the random beams are generated such that beams which have obtained a high score in the first training phase are more likely to be chosen, control, in the second training stage, the responder antenna elements of the responder antenna arrays to receive a second training signal commonly transmitted by the initiator antenna elements of the one or more initiator antenna arrays by successively using different initiator antenna beams of different initiator antenna beam directions according to one or more of the selected antenna beam combinations and/or to commonly transmit a second training signal by successively using different initiator antenna beams of different initiator antenna beam directions according to one or more of the selected antenna beam combinations, and select a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

27. A beamforming method for use in a wireless communication system comprising an initiator and a responder, the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays, said beamforming method being configured for selecting one or more initiator antenna beams per initiator antenna array and one or more responder antenna beams per responder antenna array for use by the initiator and the responder in communicating with each other, said beamforming method comprising:

controlling, in a first training stage, the initiator antenna elements, per pair of initiator antenna array and responder antenna array, to transmit a first training signal by successively using different initiator antenna beams of different initiator antenna beam directions and to receive a first training signal transmitted by the responder antenna array by successively using different responder antenna beams of different responder antenna beam directions, selecting a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, wherein selecting the sub-set of antenna beam combinations for use in the second training stage includes testing a best obtained beam with crossover variants, wherein during each iteration of testing one or more of random beams for the initiator antenna arrays and highest quality obtained beams at the responder are tested, random beams for the responder antenna arrays and highest quality beams at the initiator are tested, random beams for both initiator and responder are tested, and the highest quality obtained beams are tested, wherein the random beams are generated such that beams which have obtained a high score in the first training phase are more likely to be chosen, controlling, in the second training stage, the initiator antenna elements of the initiator antenna arrays to commonly transmit a second training signal by successively using different initiator antenna beams of different initiator antenna beam directions according to the selected antenna beam combinations, and/or to receive a second training signal commonly transmitted by the responder antenna elements of the one or more responder antenna arrays by successively using different responder antenna beams of different responder antenna beam directions according to the selected antenna beam combinations, and selecting a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

28. A beamforming method for use in a wireless communication system comprising an initiator and a responder, the initiator having one or more initiator antenna arrays each comprising two or more initiator antenna elements and/or the responder having one or more responder antenna arrays each comprising two or more responder antenna elements, wherein the initiator has at least two initiator antenna arrays and/or the responder has at least two responder antenna arrays, said beamforming method being configured for selecting one or more initiator antenna beams per initiator antenna array and one or more responder antenna beams per responder antenna array for use by the initiator and the responder in communicating with each other, said beamforming method comprising:

controlling, in a first training stage, the responder antenna elements, per pair of initiator antenna array and responder antenna array to receive a first training signal transmitted by the initiator antenna array by successively using different initiator antenna beams of different initiator antenna beam directions and to transmit a first training signal by successively using different responder antenna beams of different responder antenna beam directions, selecting a sub-set of the antenna beam combinations that have been used in the first training stage or are derived from the antenna beam combination used in the first training stage, for use in a second training stage, wherein at least some of the antenna beam combinations of said sub-set are selected by use of first responder quality information indicating the quality of reception of the first training signals by the respective responder antenna array for the different initiator antenna beams used by the respective initiator antenna array for transmitting the first training signal and first initiator quality information indicating the quality of reception of the first training signals by the respective initiator antenna array for the different responder antenna beams used by the respective responder antenna array for transmitting the first training signal in the first training stage, wherein the first responder quality information and the first initiator quality information obtained for the different pairs of initiator antenna arrays and responder antenna arrays of the first training stage is used, wherein selecting the sub-set of antenna beam combinations for use in the second training stage includes testing a best obtained beam with crossover variants, wherein during each iteration of testing one or more of random beams for the initiator antenna arrays and highest quality obtained beams at the responder are tested, random beams for the responder antenna arrays and highest quality beams at the initiator are tested, random beams for both initiator and responder are tested, and the highest quality obtained beams are tested, wherein the random beams are generated such that beams which have obtained a high score in the first training phase are more likely to be chosen, controlling, in the second training stage, the responder antenna elements of the responder antenna arrays to receive a second training signal commonly transmitted by the initiator antenna elements of the one or more initiator antenna arrays by successively using different initiator antenna beams of different initiator antenna beam directions according to the selected antenna beam combinations and/or to commonly transmit a second training signal by successively using different initiator antenna beams of different initiator antenna beam directions according to the selected antenna beam combinations, and selecting a final antenna beam combination for use by the initiator and the responder in communicating with each other from second responder quality information indicating the quality of reception of the second training signals by the responder antenna arrays for the different initiator antenna beams used by the initiator antenna arrays for transmitting the second training signal and/or from second initiator quality information indicating the quality of reception of the second training signals by the initiator antenna arrays for the different responder antenna beams used by the responder antenna arrays for transmitting the second training signal in the second training stage.

29. A communication device for communicating with another communication device in a wireless communication system, said communication device comprising:

one or more antenna arrays each comprising two or more antenna element, and a beamforming device as claimed in claim 1.

30. A communication system including a beamforming device as claimed in claim 1 and two or more communication devices, each having at least one antenna array each comprising two or more antenna element, wherein at least one communication device has at least two antenna arrays.

31. A non-transitory computer-readable recording medium that stores therein a computer program product, which, when executed by a processor, causes a beamforming method according to claim 27 to be performed.

32. A beamforming device for use in a wireless communication system, wherein said beamforming device is configured to transmit at least part of responder selection information and/or initiator selection information by use of an additional frame, in particular a control trailer, wherein an indicator is used to indicate the use of an additional frame and/or the amount of information in the additional frame, wherein said responder selection information indicates the responder antenna beams of a selected sub-set of antenna beam combinations to a responder for use in a second training stage and/or said initiator selection information indicates the initiator antenna beams of a selected sub-set of antenna beam combinations to an initiator for use in a second training stage, wherein the selected sub-set of antenna beam combinations for use in the second training stage includes testing a best obtained beam with crossover variants, wherein during each iteration of testing one or more of random beams for the initiator antenna arrays and highest quality obtained beams at the responder are tested, random beams for the responder antenna arrays and highest quality beams at the initiator are tested, random beams for both initiator and responder are tested, and the highest quality obtained beams are tested, wherein the random beams are generated such that beams which have obtained a high score in a first training phase are more likely to be chosen.

* * * * *